United States Patent
Alkhatib et al.

(10) Patent No.: US 8,234,358 B2
(45) Date of Patent: *Jul. 31, 2012

(54) COMMUNICATING WITH AN ENTITY INSIDE A PRIVATE NETWORK USING AN EXISTING CONNECTION TO INITIATE COMMUNICATION

(75) Inventors: Hasan S. Alkhatib, Saratoga, CA (US); Fouad A. Tabagi, Los Altos, CA (US); Farid F. Elwailly, San Jose, CA (US); Bruce C. Wootton, Palo Alto, CA (US)

(73) Assignee: Inpro Network Facility, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/233,288

(22) Filed: Aug. 30, 2002

(65) Prior Publication Data

US 2004/0044777 A1  Mar. 4, 2004

(51) Int. Cl.
G06F 15/177 (2006.01)
G06F 15/16 (2006.01)
G06F 15/173 (2006.01)

(52) U.S. Cl. ......... 709/222; 709/228; 709/237; 709/244

(58) Field of Classification Search .................. 709/222, 709/228, 237, 244

See application file for complete search history.

(56) References Cited

U.S. PATENT DOCUMENTS

| | | |
|---|---|---|
| 5,159,592 A | 10/1992 | Perkins |
| 5,361,256 A | 11/1994 | Doeringer et al. |
| 5,563,878 A | 10/1996 | Blakeley |
| 5,623,605 A | 4/1997 | Keshav et al. |
| 5,701,427 A | 12/1997 | Lathrop |
| 5,717,686 A | 2/1998 | Schiavoni |
| 5,717,687 A | 2/1998 | Minot et al. |
| 5,734,651 A | 3/1998 | Blakeley |
| 5,751,961 A | 5/1998 | Smyk |
| 5,754,938 A | 5/1998 | Herz et al. |

(Continued)

FOREIGN PATENT DOCUMENTS

EP    0 817 444 A2    1/1998

OTHER PUBLICATIONS

RFC1631 The IP Network Address Translator (NAT), May 1994.

(Continued)

*Primary Examiner* — Gregory Todd
(74) *Attorney, Agent, or Firm* — McAndrews, Held & Malloy, Ltd.

(57) ABSTRACT

A system is disclosed that allows an entity outside of a private network to initiate communication with another entity inside the private network. A first entity inside the private network maintains a persistent connection with a second entity outside the private network, with a port identification associated with the first entity's persistent connection. A third entity outside the private network obtains the port identification and initiates communication with the first entity by sending a message to the first entity using the port identification. The first and third entities then exchange communications outside the persistent connection. In an alternate implementation, the third entity uses the port identification to send the first entity a request for establishing a connection. The request is forwarded to the first entity through the persistent connection. The first entity responds by establishing a connection with the third entity outside the persistent connection.

39 Claims, 17 Drawing Sheets

U.S. PATENT DOCUMENTS

| | | | |
|---|---|---|---|
| 5,764,906 A | 6/1998 | Edelstein et al. | |
| 5,777,989 A | 7/1998 | McGarvey | |
| 5,781,550 A | 7/1998 | Templin et al. | |
| 5,790,548 A | 8/1998 | Sistainizadeh et al. | |
| 5,793,763 A | 8/1998 | Mayes et al. | |
| 5,805,818 A | 9/1998 | Perlman et al. | |
| 5,805,820 A | 9/1998 | Bellovin et al. | |
| 5,815,664 A | 9/1998 | Asano | |
| 5,826,014 A | 10/1998 | Coley et al. | |
| 5,856,974 A | 1/1999 | Gervais et al. | |
| 5,864,666 A | 1/1999 | Shrader | |
| 5,867,667 A | 2/1999 | Butman et al. | |
| 5,884,038 A | 3/1999 | Kapoor | |
| 5,884,246 A | 3/1999 | Boucher et al. | |
| 5,889,953 A | 3/1999 | Thebaut et al. | |
| 5,897,662 A | 4/1999 | Corrigan et al. | |
| 5,898,830 A | 4/1999 | Wesinger, Jr. et al. | |
| 5,913,210 A | 6/1999 | Call | |
| 5,937,162 A | 8/1999 | Funk et al. | |
| 5,937,163 A | 8/1999 | Lee et al. | |
| 6,003,084 A | 12/1999 | Green et al. | |
| 6,006,272 A | 12/1999 | Aravamudan | |
| 6,032,196 A | 2/2000 | Monier | |
| 6,047,325 A | 4/2000 | Jain et al. | |
| 6,055,236 A * | 4/2000 | Nessett et al. | 709/245 |
| 6,055,575 A * | 4/2000 | Paulsen et al. | 709/229 |
| 6,058,431 A | 5/2000 | Srisuresh | |
| 6,061,349 A | 5/2000 | Coile et al. | |
| 6,061,738 A | 5/2000 | Osaku et al. | |
| 6,101,543 A | 8/2000 | Alden et al. | |
| 6,119,171 A | 9/2000 | Alkhatib | |
| 6,122,276 A | 9/2000 | Boe et al. | |
| 6,128,664 A | 10/2000 | Yanagidate | |
| 6,137,791 A | 10/2000 | Frid et al. | |
| 6,154,777 A | 11/2000 | Ebrahim | |
| 6,154,839 A * | 11/2000 | Arrow et al. | 713/154 |
| 6,173,399 B1 | 1/2001 | Gilbrech | |
| 6,219,715 B1 | 4/2001 | Ohno et al. | |
| 6,226,751 B1 | 5/2001 | Arrow | |
| 6,243,749 B1 | 6/2001 | Sitaraman et al. | |
| 6,249,801 B1 | 6/2001 | Zisapel et al. | |
| 6,266,707 B1 | 7/2001 | Boden et al. | |
| 6,304,906 B1 | 10/2001 | Bhatti | |
| 6,353,614 B1 * | 3/2002 | Borella et al. | 370/389 |
| 6,353,886 B1 | 3/2002 | Howard et al. | |
| 6,381,638 B1 * | 4/2002 | Mahler et al. | 709/220 |
| 6,421,732 B1 | 7/2002 | Alkhatib | |
| 6,430,622 B1 | 8/2002 | Aiken et al. | |
| 6,430,623 B1 * | 8/2002 | Alkhatib | 709/245 |
| 6,438,597 B1 | 8/2002 | Mosberger | |
| 6,438,612 B1 | 8/2002 | Ylonen | |
| 6,452,925 B1 | 9/2002 | Sistanizadeh et al. | |
| 6,457,061 B1 | 9/2002 | Bal | |
| 6,477,565 B1 | 11/2002 | Daswani et al. | |
| 6,480,508 B1 * | 11/2002 | Mwikalo et al. | 709/245 |
| 6,490,289 B1 | 12/2002 | Zhang et al. | |
| 6,496,867 B1 | 12/2002 | Beser | |
| 6,507,873 B1 | 1/2003 | Suzuki et al. | |
| 6,510,154 B1 | 1/2003 | Mayes | |
| 6,523,068 B1 | 2/2003 | Beser | |
| 6,556,584 B1 | 4/2003 | Horsley | |
| 6,557,037 B1 | 4/2003 | Provino | |
| 6,557,306 B1 | 5/2003 | Sekiya | |
| 6,591,306 B1 | 7/2003 | Redlich | |
| 6,594,704 B1 | 7/2003 | Birenback | |
| 6,618,757 B1 | 9/2003 | Babbitt et al. | |
| 6,629,137 B1 * | 9/2003 | Wynn | 709/223 |
| 6,631,416 B2 | 10/2003 | Bendinelli | |
| 6,651,101 B1 * | 11/2003 | Gai et al. | 709/224 |
| 6,657,991 B1 | 12/2003 | Akgun | |
| 6,662,223 B1 | 12/2003 | Zhang et al. | |
| 6,697,377 B1 | 2/2004 | Ju | |
| 6,701,437 B1 | 3/2004 | Hoke | |
| 6,708,219 B1 | 3/2004 | Borella | |
| 6,722,210 B2 | 4/2004 | Armstrong | |
| 6,731,642 B1 | 5/2004 | Borella | |
| 6,742,045 B1 | 5/2004 | Albert et al. | |
| 6,747,979 B1 | 6/2004 | Banks et al. | |
| 6,754,706 B1 | 6/2004 | Swildens et al. | |
| 6,772,210 B1 | 8/2004 | Edholm | |
| 6,778,528 B1 | 8/2004 | Blair | |
| 6,779,035 B1 | 8/2004 | Gbadegesin | |
| 6,781,982 B1 | 8/2004 | Borella | |
| 6,832,322 B1 | 12/2004 | Boden | |
| 6,948,003 B1 | 9/2005 | Newman | |
| 6,961,783 B1 | 11/2005 | Cook et al. | |
| 6,970,941 B1 | 11/2005 | Caronni | |
| 6,973,485 B2 | 12/2005 | Ebata | |
| 6,981,020 B2 | 12/2005 | Miloslavsky | |
| 6,982,953 B1 | 1/2006 | Swales | |
| 6,983,319 B1 * | 1/2006 | Lu et al. | 709/223 |
| 6,993,012 B2 | 1/2006 | Liu | |
| 6,993,595 B1 | 1/2006 | Luptowski | |
| 6,996,628 B2 | 2/2006 | Keane | |
| 6,996,631 B1 | 2/2006 | Aiken | |
| 7,003,481 B2 | 2/2006 | Banka | |
| 7,010,702 B1 | 3/2006 | Bots | |
| 7,028,333 B2 | 4/2006 | Tuomenoksa | |
| 7,028,334 B2 | 4/2006 | Tuomenoksa | |
| 7,032,242 B1 * | 4/2006 | Grabelsky et al. | 726/11 |
| 7,054,322 B2 | 5/2006 | D'Annunzio | |
| 7,058,052 B2 | 6/2006 | Westphal | |
| 7,068,655 B2 | 6/2006 | March | |
| 7,072,337 B1 | 7/2006 | Arutyunov | |
| 7,072,935 B2 | 7/2006 | Kehoe et al. | |
| 7,085,854 B2 | 8/2006 | Keane | |
| 7,092,390 B2 | 8/2006 | Wan | |
| 7,107,464 B2 | 9/2006 | Shapira | |
| 7,107,614 B1 | 9/2006 | Boden | |
| 7,110,375 B2 | 9/2006 | Khalil | |
| 7,120,676 B2 | 10/2006 | Nelson et al. | |
| 7,133,368 B2 * | 11/2006 | Zhang et al. | 370/249 |
| 7,139,828 B2 * | 11/2006 | Alkhatib et al. | 709/230 |
| 7,181,542 B2 | 2/2007 | Tuomenoksa et al. | |
| 7,194,553 B2 | 3/2007 | Lucco | |
| 7,227,864 B2 * | 6/2007 | Collins et al. | 370/392 |
| 7,327,721 B2 | 2/2008 | Balasaygun et al. | |
| 7,424,737 B2 | 9/2008 | Wesinger et al. | |
| 7,490,151 B2 | 2/2009 | Munger et al. | |
| 7,362,719 B2 | 8/2009 | Jemes et al. | |
| 7,676,579 B2 * | 3/2010 | Harris et al. | 709/227 |
| 2001/0027474 A1 | 10/2001 | Nachman et al. | |
| 2001/0050914 A1 | 12/2001 | Akahane et al. | |
| 2002/0013848 A1 | 1/2002 | Rene Salle | |
| 2002/0016826 A1 * | 2/2002 | Johansson et al. | 709/207 |
| 2002/0026525 A1 | 2/2002 | Armitage | |
| 2002/0053031 A1 | 5/2002 | Bendinelli et al. | |
| 2002/0056008 A1 | 5/2002 | Keane et al. | |
| 2002/0078198 A1 * | 6/2002 | Buchbinder et al. | 709/224 |
| 2002/0091859 A1 | 7/2002 | Tuomenoksa et al. | |
| 2002/0099937 A1 | 7/2002 | Tuomenoksa | |
| 2002/0103931 A1 | 8/2002 | Mott | |
| 2002/0133534 A1 | 9/2002 | Forslow | |
| 2003/0018912 A1 * | 1/2003 | Boyle et al. | 713/201 |
| 2003/0041091 A1 | 2/2003 | Cheline | |
| 2003/0041136 A1 | 2/2003 | Cheline | |
| 2003/0055978 A1 * | 3/2003 | Collins | 709/227 |
| 2003/0065785 A1 * | 4/2003 | Jain | 709/227 |
| 2003/0074472 A1 | 4/2003 | Lucco et al. | |
| 2003/0084162 A1 * | 5/2003 | Johnson et al. | 709/227 |
| 2003/0123421 A1 | 7/2003 | Feige | |
| 2003/0131131 A1 | 7/2003 | Yamada et al. | |
| 2003/0152068 A1 | 8/2003 | Balasaygun et al. | |
| 2003/0208554 A1 | 11/2003 | Holder | |
| 2003/0212795 A1 * | 11/2003 | Harris et al. | 709/227 |
| 2003/0219000 A1 | 11/2003 | Magret | |
| 2004/0006708 A1 | 1/2004 | Mukherjee | |
| 2004/0088542 A1 | 5/2004 | Daude | |
| 2004/0111612 A1 | 6/2004 | Choi | |
| 2004/0148439 A1 | 7/2004 | Harvey | |
| 2004/0249911 A1 | 12/2004 | Alkhatib | |
| 2006/0190607 A1 | 8/2006 | Lowery et al. | |
| 2006/0195524 A1 | 8/2006 | Nichols et al. | |
| 2006/0195539 A1 | 8/2006 | Nichols et al. | |
| 2006/0212545 A1 | 9/2006 | Nichols et al. | |
| 2006/0212599 A1 | 9/2006 | Lucco et al. | |

| | | |
|---|---|---|
| 2007/0286189 A1 | 12/2007 | Kreiner et al. |
| 2008/0232295 A1 | 9/2008 | Kreiner et al. |
| 2009/0116487 A1 | 5/2009 | Read |

OTHER PUBLICATIONS

Venters, Demystifying Protocols: A comparison of Protocols Suitable for IP Telephony, Sonus Networks, pp. 1-11, 2000.
Tsuchiya, et al., Extending the IP Internet Through Address Reuse, ACM SIGCOMM Computer Communication Review, pp. 16-33, Jan. 1993.
Francis, et al., IPNL: A NAT-Extended Internet Architecture, SIGCOMM'01, Aug. 27-31, 2001, pp. 69-79.
Yalagandula, et al., Transparent Mobility with Minimal Infrastructure, University of Texas at Austin, pp. 1-14, Jul. 2001.
Teraoka, et al., VIP: A Protocol Providing Host Mobility, Communications of the ACM, Aug. 1994/vol. 37, No. 8, pp. 67-75, 113.
Egevang, et al., The IP Network Address Translator (NAT), Network Working Group, RFC 1631, May 1994, pp. 1-10.
Chatel, Classical Versus Transparent IP Proxies, Network Working Group, RFC 1919, Mar. 1996, pp. 1-35.
Finseth, An Access Control Protocol, Sometimes Called TACACS, Network Working Group, Jul. 1993, pp. 1-18.
Computer Netowrks, Third Edition, by Andrew S. Tanenbaum, 1996, pp. 643-670, 685-691.
Perkins, Mobile IP, IEEE Communications Magazine, May 1997, pp. 84-99.
Sidhu, Inside Apple Talk, 2nd ed., Addison-Wesley, 1990.
DROMS, RFC 1541, Dynamic Host Configuration Protocol, Oct. 1993.
Tanenbaum, Andrew S., "Computer Networks", Third Edition,(1996),1-37.
"Excerpts from Help Section of Microsoft Outlook", pertaining to rules and forwarding email,1-3.
Egevang, K et al., "The IP Network Address Translator (NAT)", (May 1994),1-10.
Kessler, Gary "Mobile IP: Harbiner of Untethered Computing", http://www.arykessler.net/librarymobileip.htm, (Jan. 20, 2004).
Rekhter, ""Cisco Systems" Tag Switching Architecture Overview", Network Working Group, (Feb. 1997).
Kent, ""Security Architecture for the Internet Protocol"", Network Working Group, (Nov. 1998).
"Computer Dictionary", Microsoft Press; 3rd Edition, (1997),p. 264.
Chatel, M "Classical versus Transparent IP Proxies", Network Working Group Request for Comments, (Mar. 1996), 1-35.
Finseth, C "An Access Control Protocol , Sometimes Called TACACS", Network Working Group Request for Comments, (Jul. 1993),1-18.
Francis, Paul et al., "IPNL: A NAT-Extended Internet Architecture", SIGCOMM'01, (Aug. 1, 2008),69-79.
Perkins, Charles E., "Mobile IP", IEEE Communications Magazine, Sun Microsystems,(May 1997),84-99.
Teraoka, Fumio et al., "VIP: A Protocol Providing Host Mobility", Communications of the ACM, vol. 37, No. 8,(Aug. 1994),67-75, 113.
Tsuchiya, Paul F., et al., "Extending the IP Internet Through Address Reuse", ACM SIGCOMM Computer Communication Review, (Jan. 1993),16-33.
Venters, Tracy "Demystifying Protocols: A Comparison of Protocols Suitable for IP Telephony", Sonus Networks, (2000),1-11.
Yalagandula, Praveen et al., "Transparent Mobility with Minimal Infrastucture", University of Texas at Austin, (Jul. 2001),1-14.
"Non Final Office Action", U.S. Appl. No. 10/161,573, (May 26, 2009),39 pages.
"Non Final Office Action", U.S. Appl. No. 10/403,829, (Jun. 22, 2009),26 pages.
Francis, Gummadi "IPNL: A NAT-Extended Internet Architecture", SIGCOMM '01, (Aug. 2001),69-79.
"Final Office Action", U.S. Appl. No. 10/403,518, (Feb. 2, 2010), 26 pages.
"Final Office Action", U.S. Appl. No. 10/403,829, (Feb. 23, 2010), 15 pages.
"Advisory Action", U.S. Appl. No. 10/403,829, (May 14, 2010), 2 pages.
"Final Office Action", U.S. Appl. No. 10/161,573, (Jul. 23, 2010), 21 pages.
"Non Final Office Action", U.S. Appl. No. 10/403,518, (Aug. 3, 2010), 30 pages.
"Final Office Action", U.S. Appl. No. 10/403,818, (Sep. 1, 2010), 6 pages.
Rekhter, "Cisco Systems' Tag Switching Architecture Overview," Network Working Group, Feb. 1997.
Kent, "Security Architecture for the Internet Protocol," Network Working Group, Nov. 1998.
Computer Dictionary; Microsoft Press; 3rd Edition; 1997; p. 264.
Kessler, Gary C., "Mobile IP: Harbiner of Untethered Computing," http://www.garykessler.net/library/mobileip.htm, Jan. 20, 2004.

* cited by examiner

COMMUNICATING WITH AN ENTITY INSIDE A PRIVATE NETWORK USING AN EXISTING CONNECTION TO INITIATE COMMUNICATION

CROSS REFERENCE TO RELATED APPLICATIONS

This application is related to the following Patents/Applications:

DOMAIN NAME ROUTING, Hasan S. Alkhatib, U.S. Pat. No. 6,119,171;

IPNET GATEWAY, Hasan S. Alkhatib and Bruce C. Wootton, U.S. application Ser. No. 09/167,709, filed on Oct. 6, 1998, issued as U.S. Pat. No. 6,421,732 on Jul. 16, 2002;

PSEUDO ADDRESSING, Bruce C. Wootton, et al., U.S. application Ser. No. 09/637,803, filed on Aug. 11, 2000; and ACCESSING AN ENTITY INSIDE A PRIVATE NETWORK, Hasan S. Alkhatib, Yun Fei Zhang, Fouad A. Tobagi and Farid F. Elwailly, U.S. application Ser. No. 10/233,289, filed the same day as the present application, Aug. 30, 2002.

Each of the related Patents/Applications are incorporated herein by reference.

BACKGROUND

1. Field of the Invention

The present invention is directed to a system for accessing an entity inside a private network.

2. Description of the Related Art

Most machines on the Internet use the TCP/IP (Transmission Control Protocol/Internet Protocol) reference model to send data to other machines on the Internet. The TCP/IP reference model includes four layers: the physical and data link layer, the network layer, the transport layer, and the application layer. The physical layer portion of the physical and data link layer is concerned with transmitting raw bits over a communication channel. The data link portion of the Physical and Data Link layer takes the raw transmission facility and transforms it into a line that appears to be relatively free of transmission errors. It accomplishes this task by having the sender break the input data up into frames, transmit the frames and process the acknowledgment frames sent back by the receiver.

The network layer permits a host to inject packets into a network and have them travel independently to the destination. On the Internet, the protocol used for the network layer is the Internet Protocol (IP).

The transport layer is designed to allow peer entities on the source and destination to carry on a "conversation." On the Internet, two protocols are used. The first one, the Transmission Control Protocol (TCP), is a reliable connection-oriented protocol that allows a byte stream originating on one machine to be delivered without error to another machine on the Internet. It fragments the incoming byte stream into discrete packets and passes each one to the network layer. At the destination, the receiving TCP process reassembles the received packets into the output stream. TCP also handles flow control to make sure a fast sender cannot swamp a slow receiver with more packets than it can handle. The second protocol used in the transport layer on the Internet is the User Datagram Protocol (UDP), which does not provide the TCP sequencing or flow control. UDP is typically used for one-shot, client server type requests-reply queries for applications in which prompt delivery is more important than accurate delivery.

The transport layer is typically thought of as being above the network layer to indicate that the network layer provides a service to the transport layer. Similarly, the transport layer is typically thought of as being below the application layer to indicate that the transport layer provides a service to the application layer.

The application layer contains the high level protocols, for example, Telnet, File Transfer Protocol (FTP), Electronic Mail—Simple Mail Transfer Protocol (SMTP), and Hypertext Transfer Protocol (HTTP).

To transmit data from a source to a destination, the Internet Protocol uses an IP address. An IP address is four bytes long, and consists of a network number and a host number. When written out, IP addresses are specified as four numbers separated by dots (e.g. 198.68.70.1). Users and software applications do not always refer to hosts or other resources by their numerical IP address. Instead of using numbers, they use ASCII strings called domain names. The Internet uses a Domain Name System (DNS) to convert a domain name to an IP address.

The Internet Protocol has been in use for over two decades. It has worked extremely well, as demonstrated by the exponential growth of the Internet. Unfortunately, the Internet is rapidly becoming a victim of its own popularity: it is running out of addresses.

One proposed solution to the depleting address problem is Network Address Translation (NAT). This concept includes predefining a number of network addresses to be private addresses. The remainder of the addresses are considered global or public addresses. Public addresses are unique addresses that should only be used by one entity having access to the Internet. That is, no two entities on the Internet should have the same public address. Private addresses are not unique and are typically used for entities not having direct access to the Internet. Private addresses can be used by more than one organization or network. NAT assumes that all of the machines on a network will not need to access the Internet at all times. Therefore, there is no need for each machine to have a public address. A local network can function with a small number of one or more public addresses assigned to one or more gateway computers. The remainder of the machines on the network will be assigned private addresses. Since entities on the network have private addresses, the network is considered to be a private network.

When a particular machine having a private address on the private network attempts to initiate a communication to a machine outside of the private network (e.g. via the Internet), the gateway machine will intercept the communication, change the source machine's private address to a public address and set up a table for translation between public addresses and private addresses. The table can contain the destination address, port numbers, sequencing information, byte counts and internal flags for each connection associated with a host address. Inbound packets are compared against entries in the table and permitted through the gateway only if an appropriate connection exists to validate their passage. One problem with the NAT approach is that it only works for communication initiated by a host within the private network to a host on the Internet that has a public IP address. The NAT approach specifically will not work if the communication is initiated by a host outside of the private network and is directed to a host with a private address in the private network.

Another problem is that mobile computing devices can be moved to new and different networks, including private networks. These mobile computing devices may need to be reachable so that a host outside of the private network can initiate communication with the mobile computing device.

However, in this case the problem is two-fold. First, there is no means for allowing the host outside of the private network to initiate communication with the mobile computing device. Second, the host outside the private network does not know the address for the mobile computing device or the network that the mobile computing device is currently connected to.

SUMMARY

The present invention, roughly described, pertains to a system for accessing an entity inside a private network. The system disclosed allows an entity outside of a private network to establish a connection with an entity inside the private network. In one embodiment, a first entity inside the private network maintains a persistent connection with a second entity outside the private network. A port identification is associated with the persistent connection. A third entity, which is outside the private network, uses the port identification to initiate communication with the first entity in the private network. The first and third entities then exchange communications outside of the persistent connection.

In one embodiment, the third entity employs the port identification to send a communication to the first entity, without using a public address unique to the first entity. In this embodiment, the third entity sends the initial communication outside of the persistent connection. The first and third entities continue to exchange communications outside of the persistent connection using the port identification.

In an alternate embodiment, the third entity uses the port identification and persistent connection to send a page communication to the first entity via the second entity. The page communication serves as a request for establishing communication. The first entity responds by establishing a connection with the third entity outside of the persistent connection. A new port identification is associated with the connection to the third entity. The first and third entities then exchange communications outside of the persistent connection using the new port identification.

The entities described above can be any device with the ability to communicate on a network, including mobile and non-mobile computing devices such as desktop computers, laptop computers, telephones, handheld computing devices, wireless devices, network appliances, servers, routers, gateways, etc. The entities can also be a software process, thread, etc.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
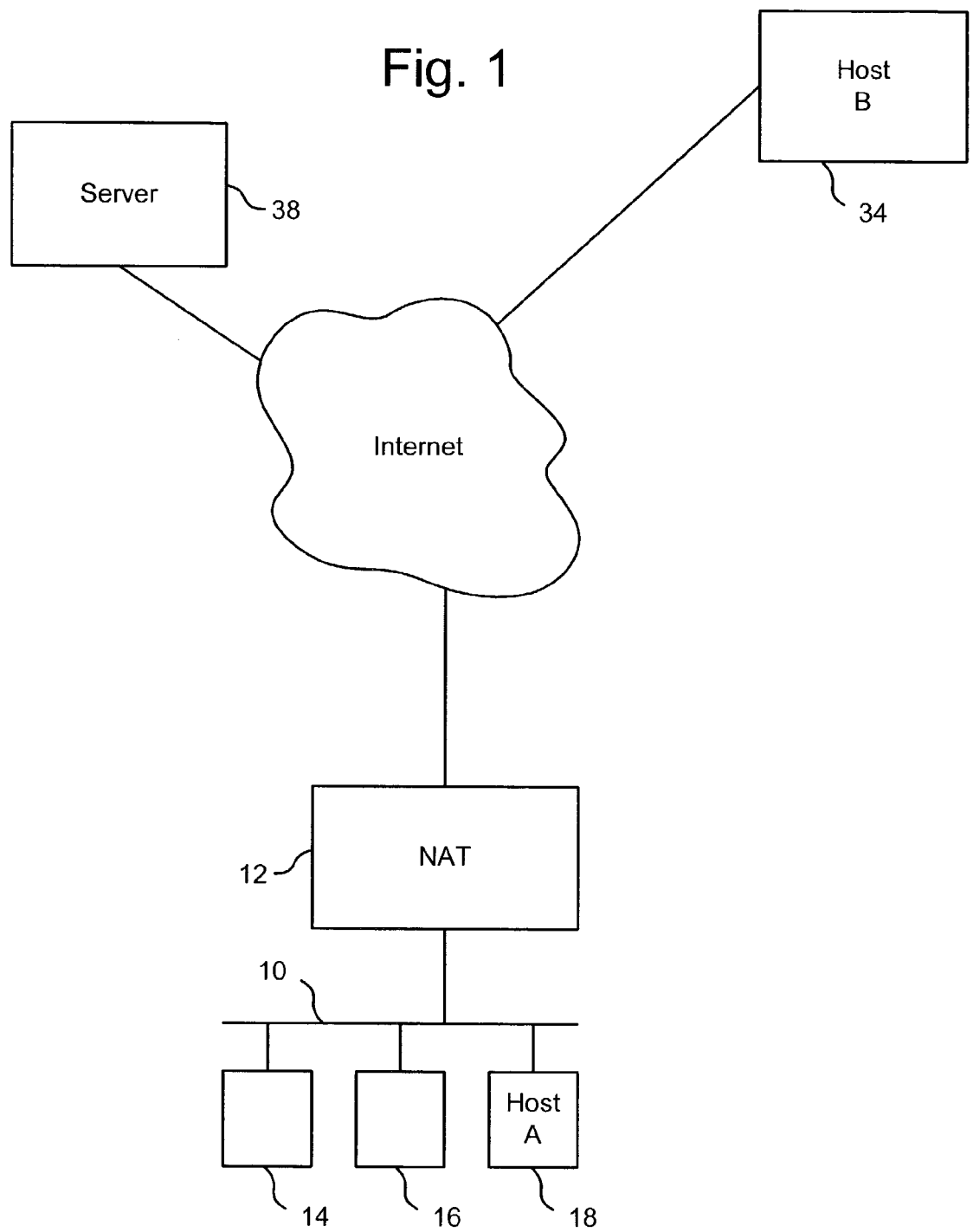
FIG. 1 depicts a block diagram of one embodiment of components of the present invention.

FIG. 1 is a block diagram of one embodiment of the components of the present invention. FIG. 1 shows private network 10. Network 10 is a private network because entities on the network use private addresses. The components connected to private network 10 include NAT device 12, and entities 14, 16, and 18. The entities can be any device that can communicate on a network, including mobile and non-mobile computing devices such as desktop computers, laptop computers, telephones, handheld computing devices, network appliances, servers, routers, gateways, wireless devices, etc. In one embodiment, each (or some) of the entities have a communication device (e.g. network interface), a storage device, I/O devices and one or more processors in communication with the above and programmed to implement the present invention. All or part of the invention can include software stored on one or more storage devices to program one or more processors. The entities can also be a software process, thread, etc. In one embodiment, NAT device 12 is a computing device that is running Network Address Translation (NAT). NAT device 12 is one example of a stateful edge switch that is designed to allow communication to be initiated in one direction. Other stateful edge switches can also be used with the present invention. FIG. 1 shows NAT device 12 connected to the Internet (or other network) so that the entities on private network 10 can communicate with other entities on the Internet using NAT. Note that it is not necessary for NAT device 12 to be a physical gateway on the edge of the network between private network 10 and the Internet. It is also possible that NAT device 12 can be inside private network 10.

FIG. 1 shows entity 18 labeled as host A. Thus, host A is an entity in a private network. In one embodiment, host A is a mobile computing device that is connected to private network 10. When host A connects to private network 10, it is assigned a private address. When host A wants to communicate outside of private network 10, NAT device 12 allows host A to communicate using a public address assigned to NAT device 12. In some embodiments, host A is a computing device that is not mobile. In other embodiments, there may be multiple subnets for NAT 12 and host A can be on any of those subnets.

FIG. 1 also shows host B 34 and server 38 connected to the Internet. According to one embodiment of the present invention, host A registers with server 38 and sets up a persistent connection with server 38 so that host A can be accessible to entities outside of private network 10. When host A establishes the persistent connection to the server, there is a connection between host A and NAT DEVICE 12 and a connection between NAT DEVICE 12 and server 38. NAT device 12 assigns a port number to the connection between NAT DEVICE 12 and server 38. This port number is used to translate between the private address for host A and the public addresses used by NAT device 12. The port number serves as a port identification for the persistent connection. In alternate embodiments, port numbers can be replaced with other types of port identification. In other embodiments, other identifiers can be used to identify the persistent connection.

In one example, host B is a computer with a public IP address. Host B knows the domain name for host A; however, host B does not know a public IP address for host A. According to the present invention, host B requests that server 38 (or another entity) resolve a domain name for host A. Server 38 responds to host B's request by returning the public IP address for NAT device 12 and the port number assigned by NAT device 12 to the persistent connection between NAT DEVICE 12 and server 38. In one embodiment, host B creates a message for host A and sends the message to the IP address and port number received from server 38. Host A and host B then continue to communicate outside of the persistent connection using the port number.

In an alternate embodiment, host B creates a message for host A and sends the message to server 38. Server 38 then forwards the message to host A via the persistent connection between server 38 and host A. In response to the communication, host A establishes a connection with host B through NAT device 12. A new port number is associated with the NAT device 12 to host B portion of the connection between hosts A and B. Hosts A and B then communicate outside of the persistent connection using the new port number.

Figure 2:
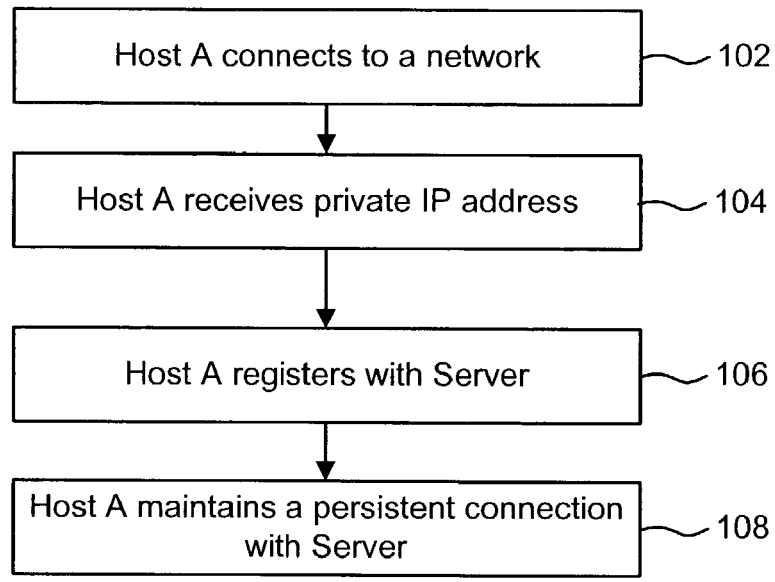
FIG. 2 is a flow chart describing one embodiment of a process for implementing a portion of the present invention.

FIG. 2 describes one embodiment of the steps taken to make host A accessible to entities outside of private network 10. In step 102, host A connects to private network 10. In step 104, host A receives a private address for communication on private network 10. In step 106, host A registers with server 38. In step 108, a persistent connection is maintained between host A and server 38. One example of a suitable persistent connection is a UDP (User Datagram Protocol) connection as described below. Other types of persistent connections can be used, such as TCP connections, other protocols, etc. In one embodiment, host A maintains the persistent connection. In other embodiments, the persistent connection is maintained by server 38, NAT device 12, a combination of server 38 and host A, or another entity. A UDP connection will normally have a timeout interval. In one embodiment, maintaining the connection includes repeatedly sending UDP segments so that a new UDP segment is sent prior to the timeout interval completing.

Figure 3:
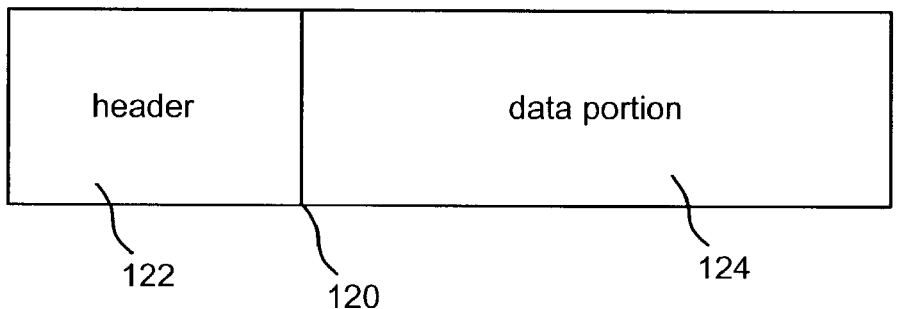
FIG. 3 depicts a UDP segment.

UDP is a protocol that operates on the transport layer of the TCP/IP stack. UDP is described in RFC 768, which is incorporated herein by reference. FIG. 3 depicts UDP segment 120, which includes header 122 and data portion 124.

Figure 4:
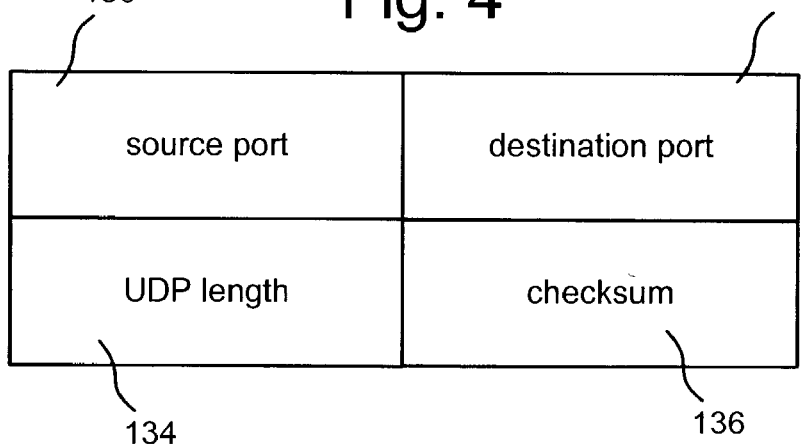
FIG. 4 depicts a header for a UDP segment.

FIG. 4 depicts the details of header 122. Header 122 is 8 bytes and includes source port 130, destination port 132, UDP length 134, and checksum 136. Source port 130 and destination port 132 identify the end points within the source and destination entities. UDP length 134 indicates the length of header 122 and data portion 124. UDP checksum 136 is provided for reliability purposes.

Figure 5:
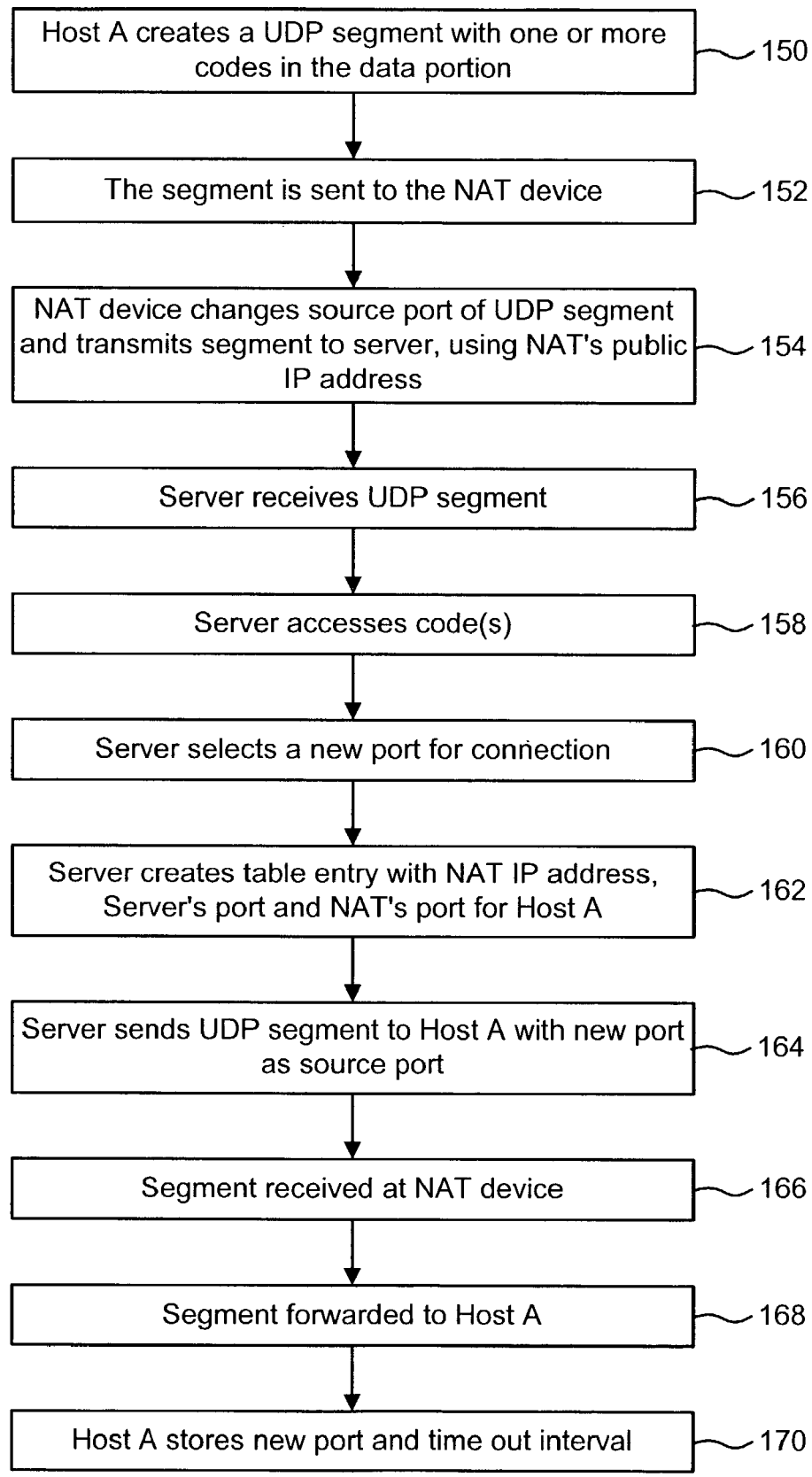
FIG. 5 is a flow chart describing one embodiment of a process for registering with a server.

FIG. 5 is a flow chart describing the process of host A registering with server 38 (step 106 of FIG. 2). In step 150, host A creates a UDP segment with one or more codes in the data portion. In one embodiment of the present invention, a protocol can be designed which includes a set of one or more codes to be stored in the data portion of UDP segments. These codes can indicate that a new connection is requested, an existing connection should be terminated, move the connection to port #, the domain name of the sender is <domain name>, the time out interval for the UDP connection is X, other messages, or a combination of the above. In one embodiment, the UDP segment(s) created in step 150 includes codes that indicate that a new connection is requested and identifies the domain name for host A. In one embodiment, the codes are sent in the data portion of the UDP segment.

In step 152, the UDP segment created in step 150 is sent to NAT device 12. For example, the UDP segment is created listing a port number for host A as its source port and a well known port for UDP on server 38 as the destination port. The UDP segment is placed within one or more IP packets. The source address of the IP packets is the private address of host A. The destination address of the IP packets is the public IP address of server 38. The IP packets are first sent to NAT device 12. In step 154, NAT device 12 receives the UDP segment and changes the source port number to a port number selected by NAT device 12 for the persistent connection. The newly selected port number can be identified as Port T—the port number supporting the persistent connection tunnel between server 38 and host A. The changed UDP segment is placed within one or more IP packets. The source address of the IP packets is a public address associated with NAT device 12. NAT device 12 stores a data structure that identifies Port T with the public address, and the private address for host A. The destination address of the IP packet is the public IP address of server 38. The UDP segment is transmitted to server 38. In step 156, the UDP segment is received by server 38. In step 158, server 38 accesses the codes in the data portion of the UDP segment and determines based on the codes that host A is requesting that a connection be set up between host A and server 38. In step 160, server 38 selects a port number on server 38 for servicing the new connection with host A.

Server 38 maintains a table for all of its connections with entities inside private networks. Data structures other than a table can also be used. Each connection has an entry in the table. Each entry stores the domain name of the entity in the private network, the public IP address used for the entity (e.g. the address provided by the NAT device), and the two port numbers (e.g. port number on server 38 and port number on NAT device 12) used for the connection. In one embodiment, other data can be stored in a table entry, such as the time out interval for the connection. In step 162, server 38 creates an entry in the table for the new connection.

In step 164, server 38 creates a UDP segment and sends it to host A. This UDP segment includes the new port number selected in step 160 as the source port number. The UDP segment may include codes in the data portion indicating that the connection has been created and the time out interval for the connection. The segment sent in step 164 is received by NAT device 12 in step 166, which translates and forwards the segment to host A in step 168. In step 170, host A stores the port number selected by server 38 (selected in step 160) and the time out interval.

Figure 6:
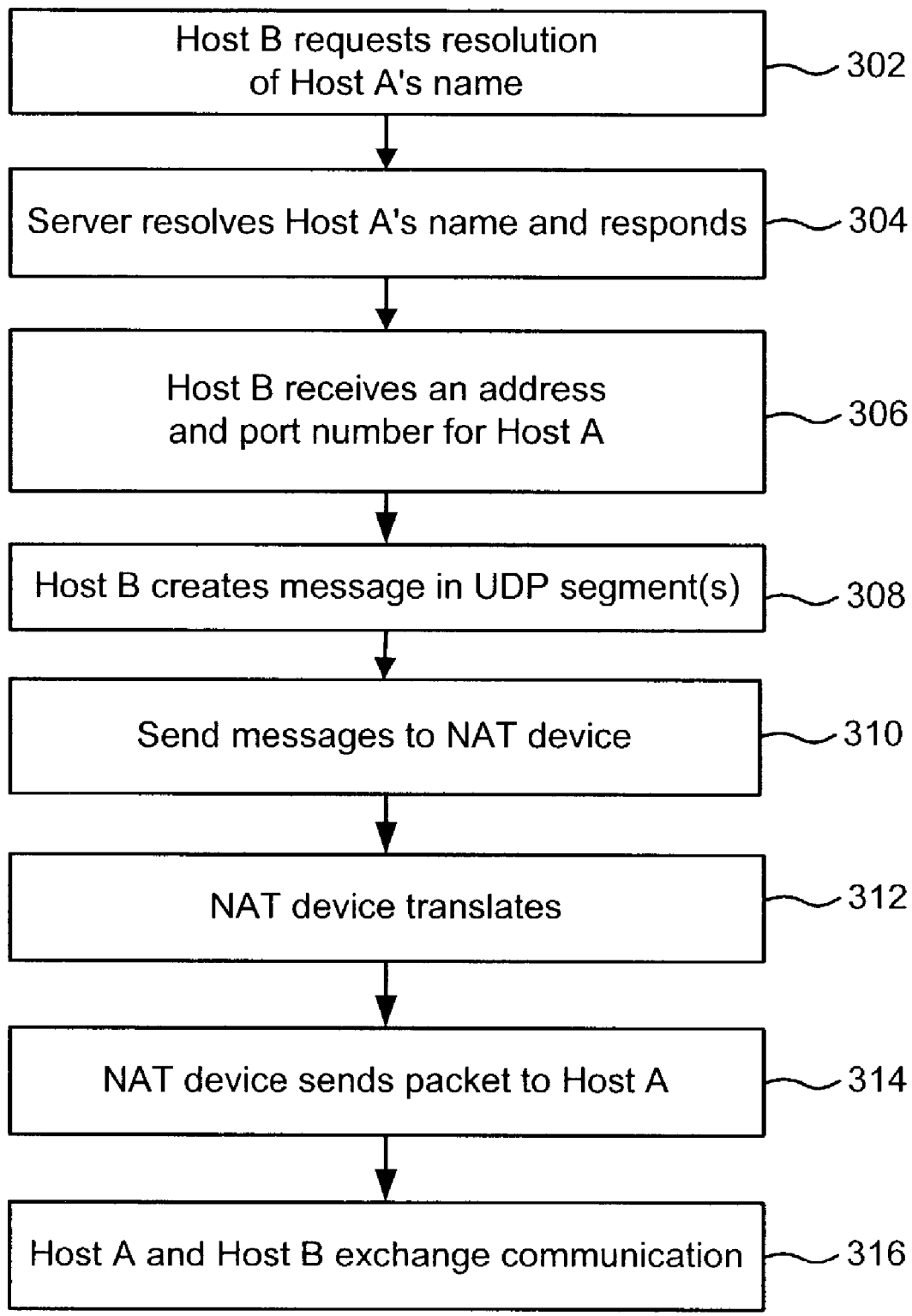
FIG. 6 is a flow chart describing one embodiment of a process for enabling and exchanging communication with an entity in a private network.

FIG. 6 is a flowchart describing one implementation of a process that is performed to establish and exchange communication between host B and host A. In one embodiment, the process illustrated by FIG. 6 can be employed in embodiments where NAT device 12 is "friendly." That is, NAT device 12 does not check the source IP address in incoming packets to ensure the source IP address is the same as the destination IP address for which the connection was established in the first place.

Host B knows the domain name for host A, but does not know an address for host A and does not know what network host A is connected to. In step 302, host B requests resolution of host A's domain name. In one embodiment, step 302 includes a request for domain name resolution. The request to resolve host A's domain name is received by server 38 through the Internet or another network path. In one embodiment, server 38 is the authoritative domain name server ("DNS") for host A.

In step 304, server 38 responds to the request for the domain name resolution by finding the appropriate DNS record that corresponds to the domain name provided. In one embodiment, the DNS record corresponding to the domain name for host A identifies: (1) the IP address of NAT device 12, and (2) the port identification of the persistent connection, which is the port number on NAT device 12 that is associated with the connection between NAT device 12 and server 38 (e.g. Port T). In one embodiment, server 38 can obtain this address information from the above-described table in server 38.

In step 306, server 38 sends host B the resolved address and port number (Port T) for the host A domain name. In the discussion above, host B is requesting resolution of the domain name. In other embodiments, other types of names or identifiers can be resolved. That is, the present invention works in other spaces. In one embodiment, server 38 or another entity responds with a standard DNS record as the resolved address for host A's domain name and a second resolution or other server provides the port number. In other embodiments, server 38 responds with a different set of information. For example, server 38 can respond with an identification code for communicating with host A, in addition to the IP address for NAT device 12 and the port number used by NAT device 12 for the persistent connection between host A and server 38.

In step 308, host B creates a message for host A. This message can include codes to request communication, a standard message from an application, secure message, IPsec packet, shim, etc. or another type of message. The message is inserted in the data portion of a UDP segment. In one embodiment, step 308 includes inserting one or more TCP segments, UDP segments, and/or IP packets into a UDP segment. In the header of the UDP segment, the destination port is set to Port T. That UDP segment is packaged into one or more IP packets that have the IP address of NAT device 12 as the destination IP address.

In step 310, the UDP segment is sent set to NAT device 12 outside of the persistent connection with server 38. In step 312, NAT device 12 translates the received message from host B, including one or more packets encapsulating the message. In one embodiment, step 312 includes changing the destination IP address to the private address for host A in network 10 and changing the port numbers in the UDP segment to reflect the connection between NAT device 12 and host A. In step 314, the translated communication is sent from NAT device 12 to host A.

In step 316, host A and host B exchange communications—sending communications back and forth between them. Messages from host B to host A are transferred as above. Messages from host A to host B are sent in a reverse manner. That is, the messages (in one embodiment) are inserted in one or more UDP segments which are first transmitted from host A to NAT device 12. At NAT device 12, the source port of the UDP segment is changed to Port T and the source IP address is changed from the private IP address for host A to the public IP address for NAT DEVICE 12. After translation, the UDP segment is sent to host B.

Figure 7:
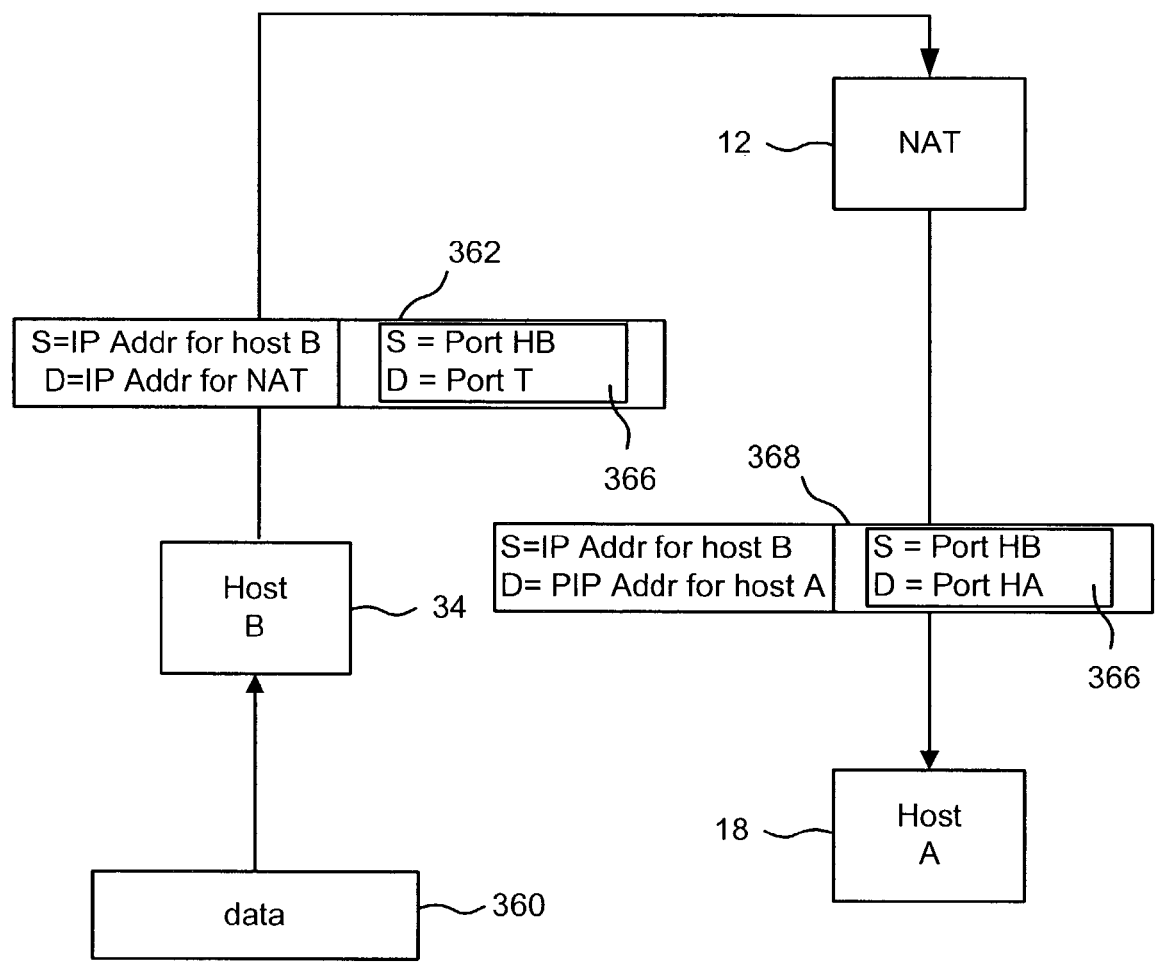
FIG. 7 is a block diagram that explains one embodiment of a process for one entity initiating communication with another entity in a private network.

FIG. 7 provides an example that explains the process of host B sending a message (the initial message or subsequent messages) to host A. Host B creates UDP segment 366, which includes Port T as the destination port and data retrieved from data store 360. UDP segment 366 also includes a port identifier associated with host B (e.g. Port HB) in the source port field. In one implementation, the data in UDP segment 366 contains a message with code calling for host A to respond to the communication. As described above, the data portion of UDP segment 366 may contain an encapsulated IP packet (or other message) for delivering data to host A. In alternate embodiments, transport layer protocols other than UDP can be employed for segment 366. Host B encapsulates UDP segment 366 in IP packet 362, which identifies the public IP address for NAT device 12 as the destination address and the public IP address for host B as the source address. In other examples, UDP segment 366 can be spread across multiple IP packets. Host B sends IP packet 362 to NAT device 12, which translates IP packet 362, as described above, into IP packet 368 for delivery to host A—enabling host A to receive the message from host B in UDP segment 366. IP packet 368 identifies the destination IP ("PIP") address as the private address used by host A in private network 10. After translation by NAT device 12, UPD segment 366 has the destination port number changed from port T to a port number on host A (e.g. Port HA).

Figure 8:
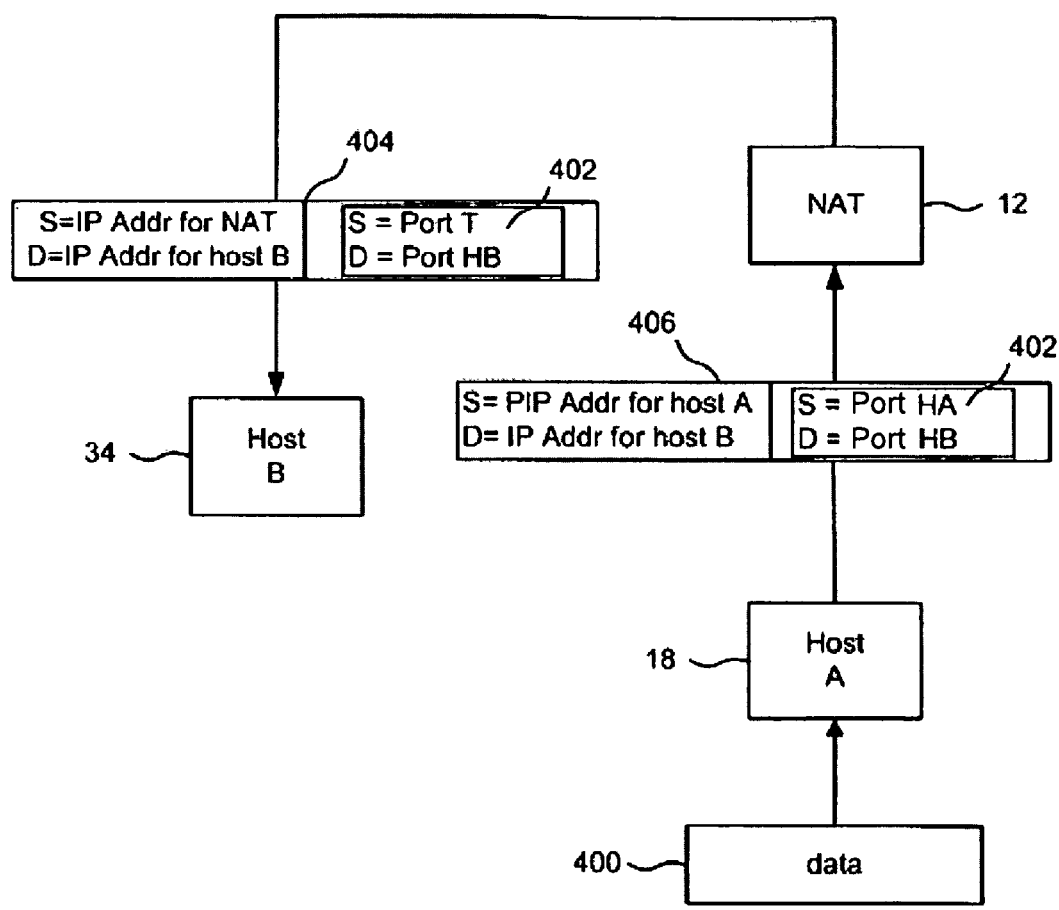
FIG. 8 is a block diagram that explains one embodiment of a process for an entity in a private network sending a message to another entity outside of the private network.

FIG. 8 is a block diagram illustrating one embodiment of a process for host A sending a communication to host B (e.g. in step 316 of FIG. 6). Host A creates a message for host B using a transport layer protocol. One example is a data portion of UDP segment 402, containing data retrieved from data store 400. In one embodiment, host A lists a source port number on host A for the connection between host A and NAT device 12 (Port HA). Host A also lists Port HB as a destination port number. The data portion of UDP segment 402 may contain an encapsulated IP packet for delivering data to host B. In alternate embodiments, transport layer protocols other than UDP can be employed.

Host A encapsulates UDP segment 402 in IP packet 406, identifying the private IP address of host A as the source address and the public IP address of host B as the destination address. In alternate embodiments, UDP segment 402 can be spread across multiple IP packets. Host A sends UDP segment 402 to NAT device 12, which translates the packet. NAT device 12 changes the source address in IP packet 404 to identify the public IP address for NAT device 12 and changes the source port number in UDP segment 402 to port T.

Figure 9:
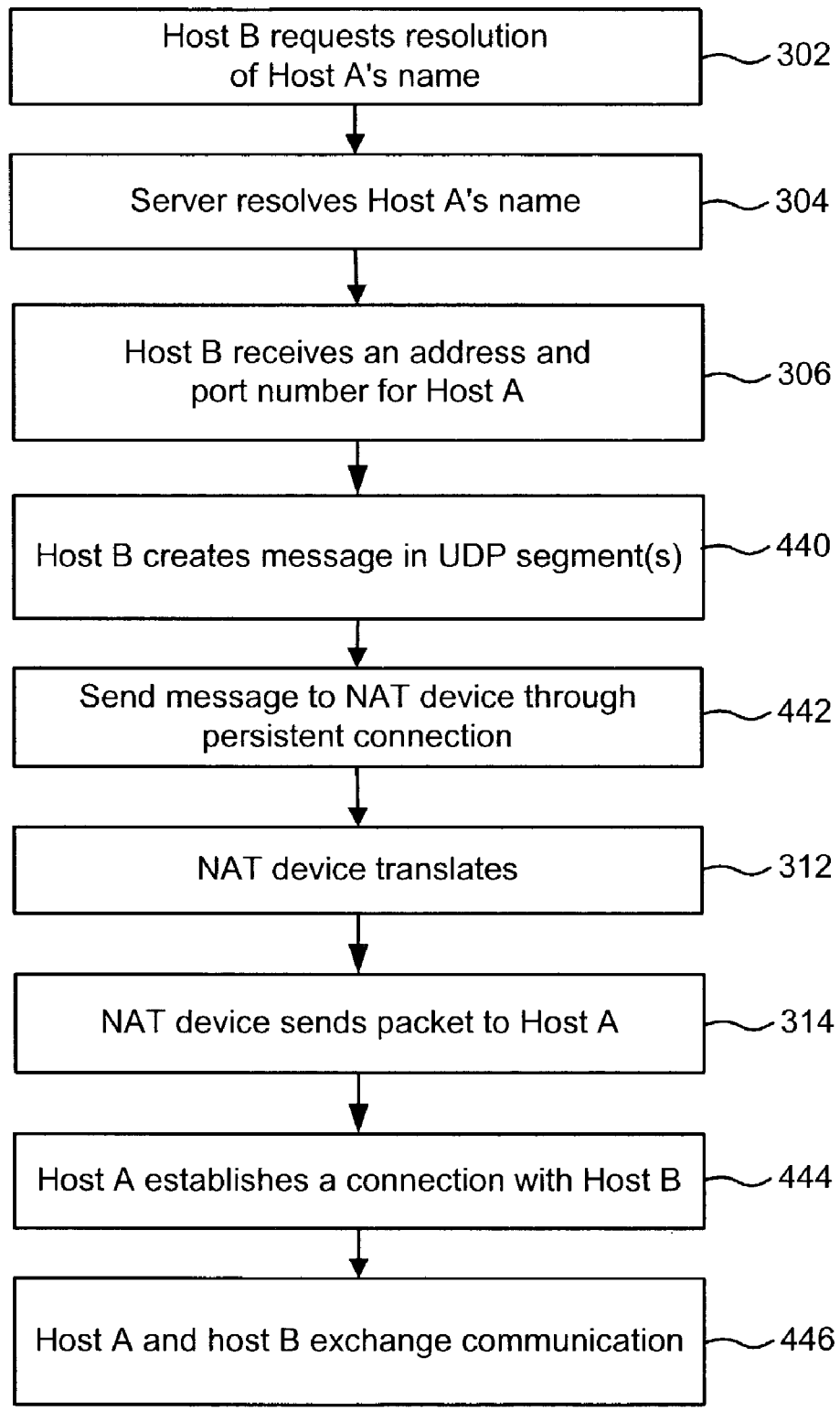
FIG. 9 is a flow chart describing another embodiment of a process for enabling and exchanging communication with an entity in a private network.
Figure 10:
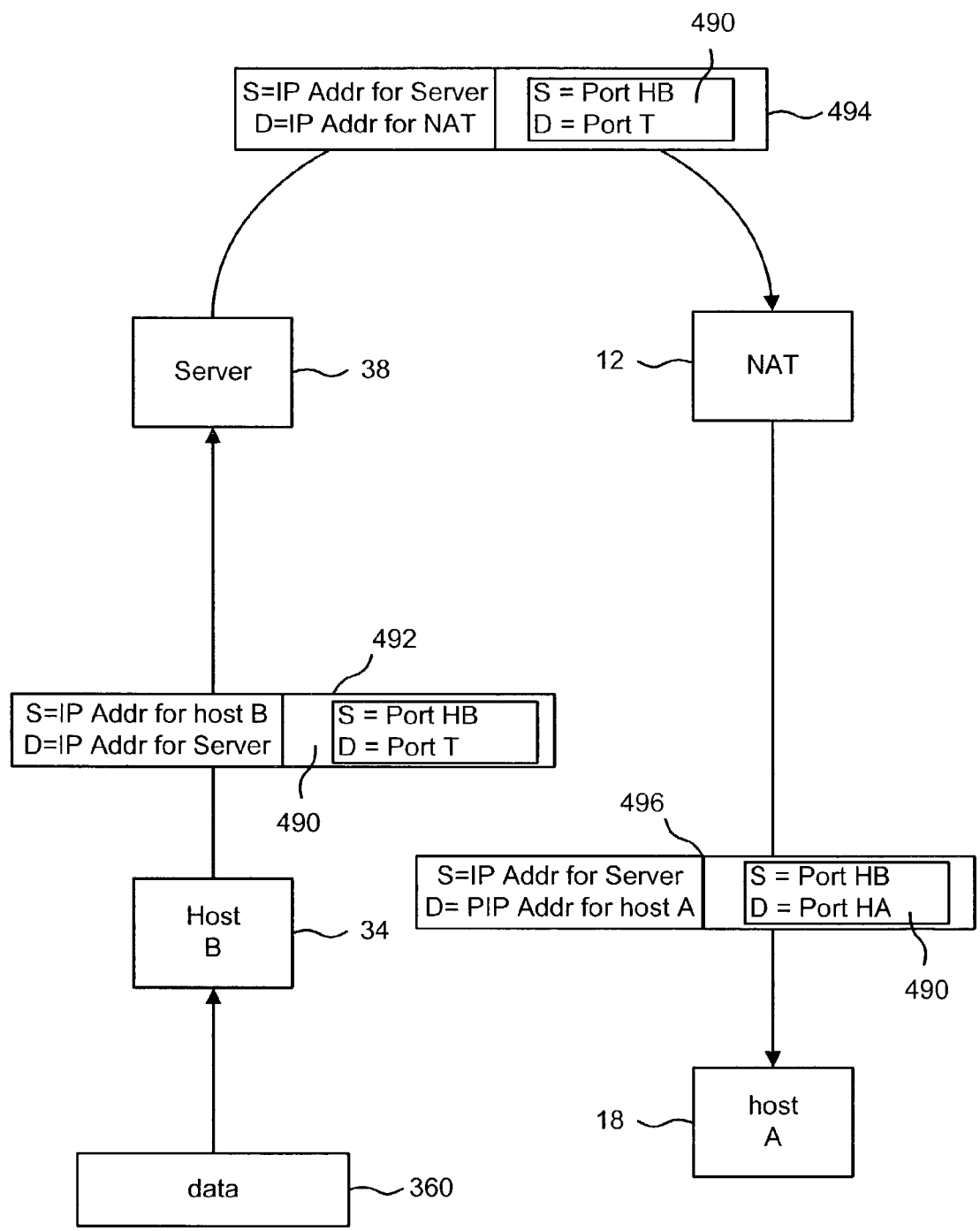
FIG. 10 is a block diagram that explains one embodiment of a process for sending a message requesting an entity in a private network to establish a connection with another entity outside of the private network.
Figure 11:
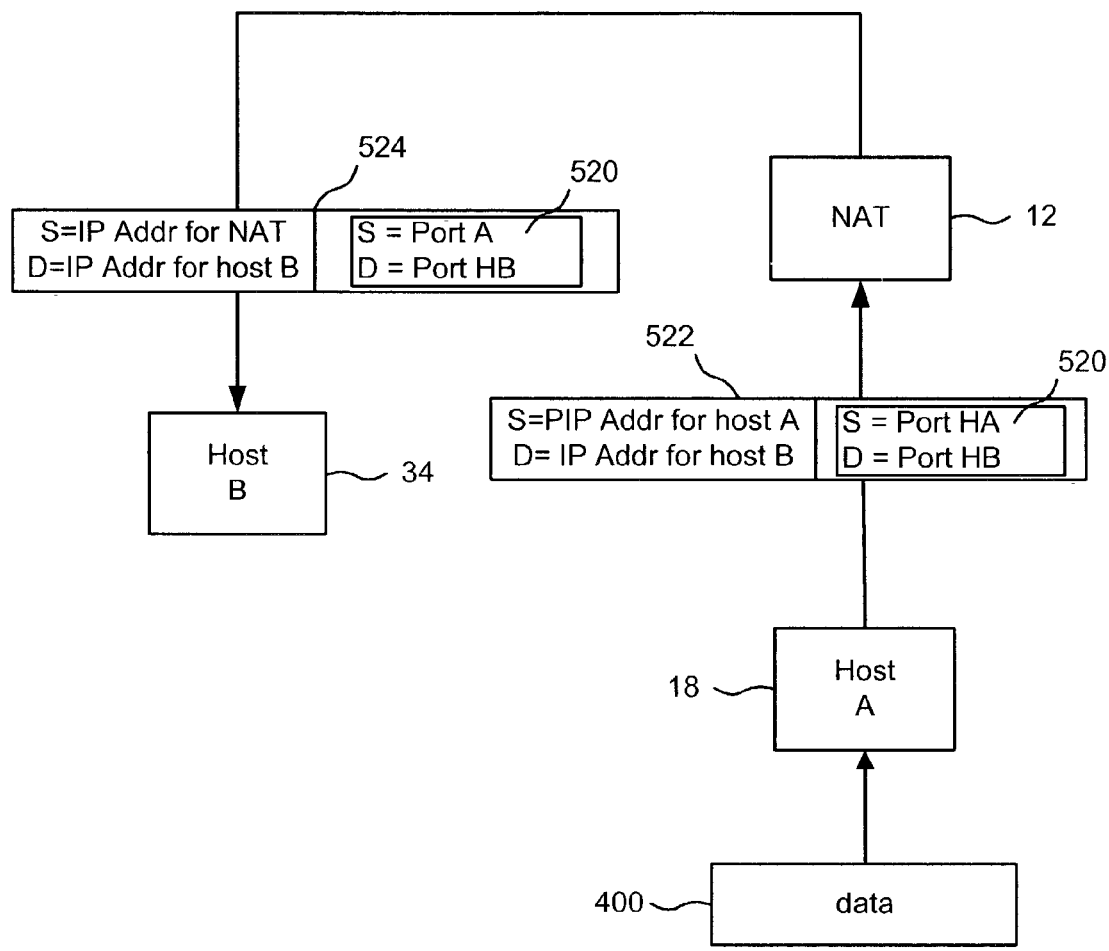
FIG. 11 is a block diagram that explains another embodiment of a process for an entity in a private network to establish a connection with another entity outside of the private network.
Figure 12:
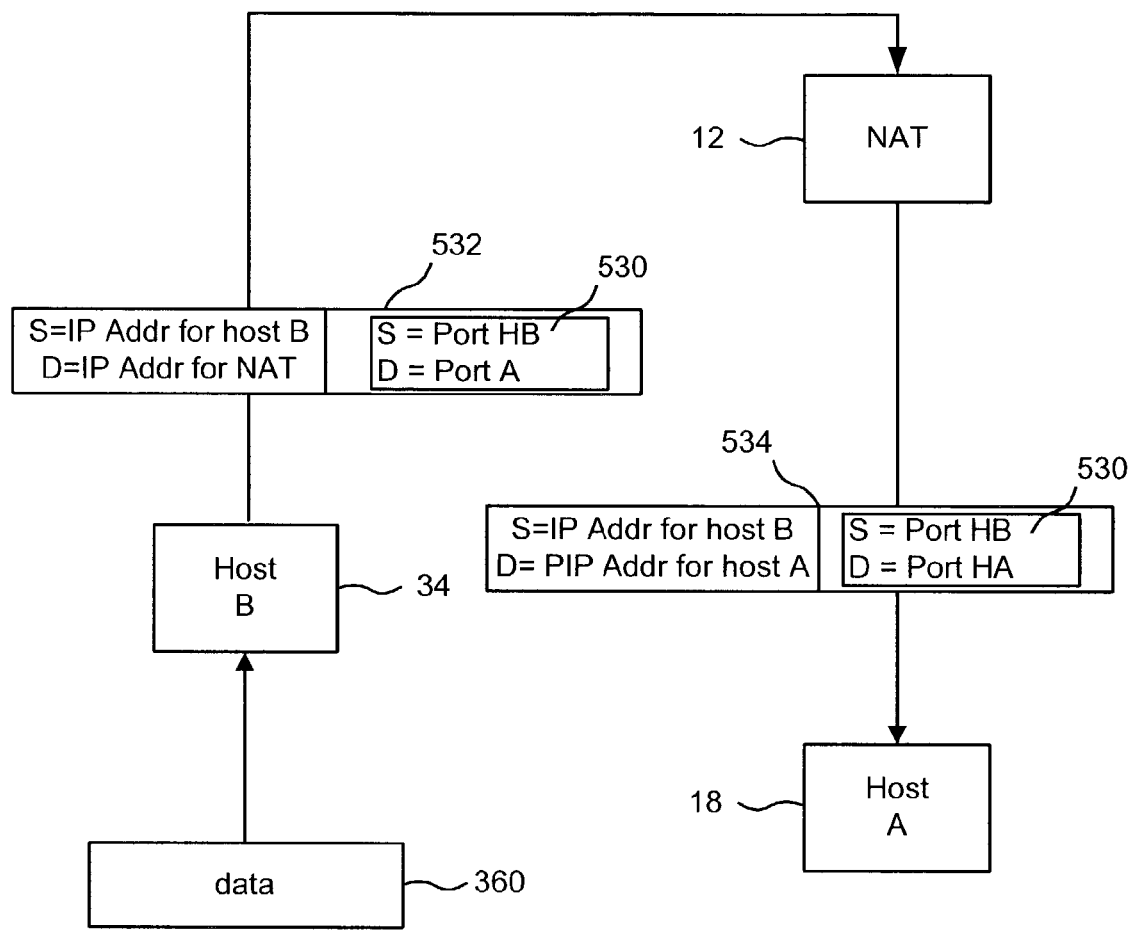
FIG. 12 is a block diagram that explains one embodiment of an entity sending a message to another entity in a private network using an established connection between the entities.

FIG. 9 is a flowchart describing an alternate process that is performed to establish and exchange communication between host B and host A. FIGS. 10-12 are block diagrams illustrating one embodiment of the process steps described in FIG. 9. The process shown in FIGS. 9-12 is employed in embodiments where NAT device 12 is "unfriendly." That is, NAT device 12 checks the source IP address on incoming packets and rejects packets in which the source IP address is not the same as the destination IP address for which the connection was established in the first place.

In FIG. 9, steps 302, 304, and 306 are the same as in FIG. 6, with host B requesting resolution of host A's domain name and receiving resolution from server 38. This provides host B with the public IP address for NAT device 12 and the port number (Port T) associated with the persistent connection between host A and server 38. In step 440, host B creates a message for host A. In one embodiment, this message includes proprietary or predetermined codes that call for host A to establish a connection with host B. Host B inserts the message in the data portion of UDP segment 490 (FIG. 10). In one embodiment, step 440 includes inserting one or more TCP segments, UDP segments, and/or IP packets into UDP segment 490.

Host B sets the destination port number in the header of UDP segment 490 to Port T and the source port number to Port HB. Host B encapsulates UDP segment 490 into one or more IP packets, such as IP packet 492 (FIG. 10). Host B sets the IP destination address in IP packet 492 to the public IP address for server 38. The IP source address in IP packet 492 is the public IP address for host B.

In step 442, host B sends UDP segment 490 to NAT device 12 using the persistent connection between server 38 and host A. That is, host B sends IP packet 492, including UDP segment 490, to server 38. Server 38 recognizes Port T as the port identification associated with the persistent connection with host A. Server 38 then uses the persistent connection to forward UDP segment 490 to NAT device 12. Server 38 converts IP packet 492 into IP packet 494 by changing the IP destination address to the public IP address for NAT device 12.

NAT device 12 translates IP packet 494 and forwards UDP segment 490 to host A in IP packet 496, as described above with reference to steps 312 and 314 in FIG. 6. In step 444, host A establishes a connection with host B in response to UDP segment 490, outside of the persistent connection with server 38. Host A creates a message for host B using a transport layer protocol, such as UDP segment 520 (FIG. 11). Host A optionally loads data for the message from data store 400 (or other structure) into the data portion of UDP segment 520. Host A includes source port number Port HA and destination port number Port HB in segment 520. In alternate embodiments, host A may use a source port number other than Port HA. Host A then forwards UDP segment 520 to NAT device 12 in IP packet 522, including the private IP address of host A as the IP source address and the public IP address of host B as the IP destination address. In alternate implementations, segment 490 can be spread across multiple IP packets. NAT device 12 changes the source port number in UDP segment 520 to a new port number, referred to here as Port A, to be associated with the connection between host B and host A. NAT device 12 also changes the IP source address in IP packet 522 to be the public IP address of NAT device 12. NAT device 12 then forwards the new packet to host B as IP packet 524, including UDP segment 520.

After host A establishes a connection with host B, hosts A and B continue to exchange message communications in step 446 (FIG. 9). UDP messages from host B to host A use destination port number A. While exchanging communications, host A operates the same as described above with reference to FIG. 11 for step 444. Host B sends messages to host A in a reverse manner, as illustrated in FIG. 12. Host B creates UDP segment 530, listing Port A as a destination port number, listing Port HB as the source port number, and optionally containing data retrieved from data store 360. Host B encapsulates UDP segment 530 in IP packet 532, identifying NAT device 12 as the destination and host B as the source. In alternate implementations, segment 530 is spread across multiple IP packets. Host B sends IP packet 532 to NAT device 12, which translates and forwards UDP segment 530 to host A. NAT device 12 changes the destination address in IP packet 532 to identify host A as the destination and forwards the packet as IP packet 534. NAT device 12 also changes the UDP segment destination port number to Port HA.

Figure 13:
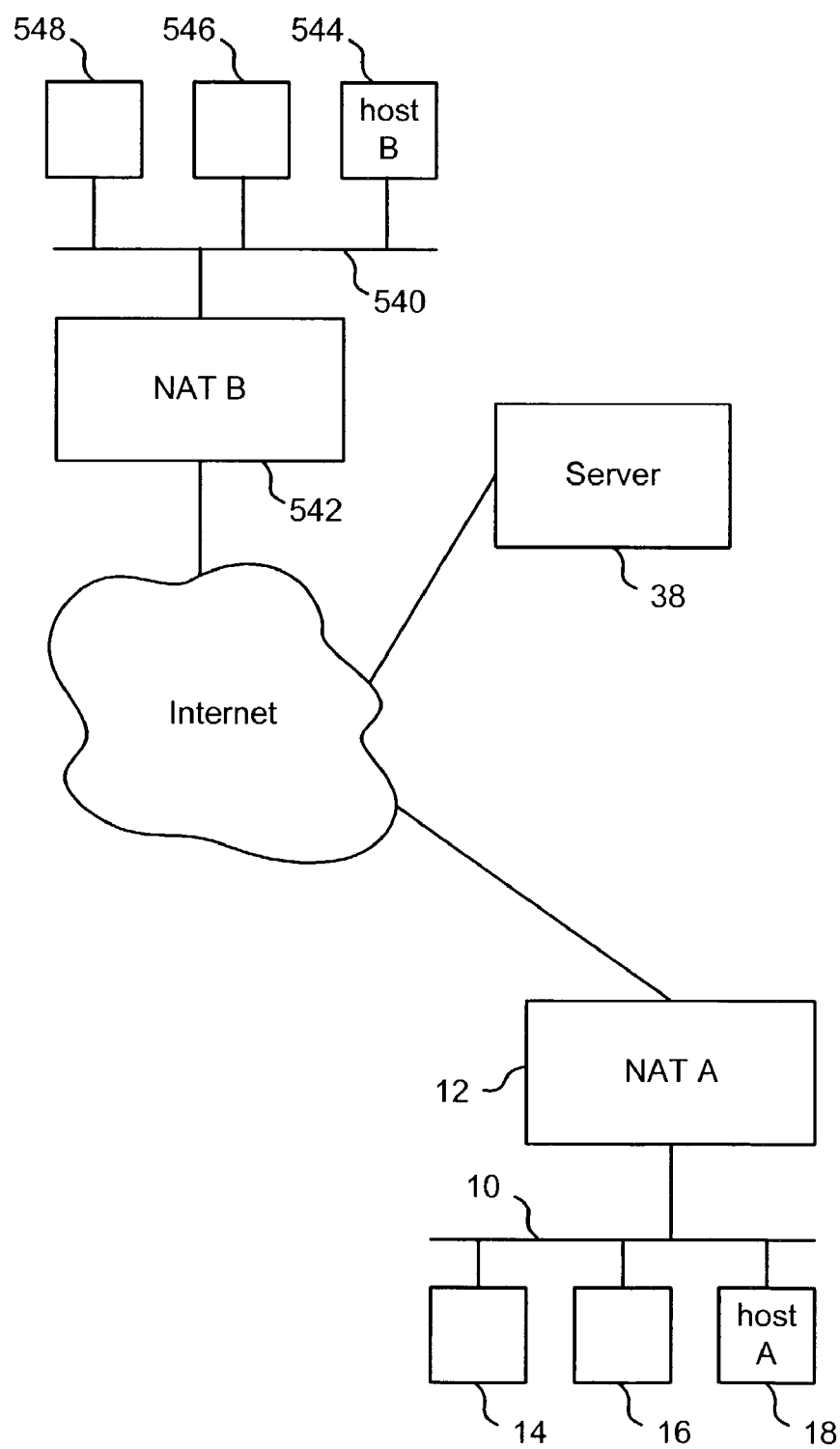
FIG. 13 depicts a block diagram of another embodiment of components of the present invention.

FIG. 13 depicts a block diagram describing another embodiment of the present invention. One difference between the embodiments of FIG. 13 and FIG. 1 is that host B is behind a NAT device. For example, FIG. 13 shows private network 540. Connected to private network 540 are NAT device 542, entity 544, entity 546 and entity 548. Entity 544 is labeled as host B. In the embodiments shown in FIGS. 13-18, host B is an entity that is provided with a private address—not a public IP address. Communications initiated by host B are provided with a public IP address by NAT device 542 (NAT B) in accordance with Network Address Translation. FIG. 13 depicts NAT device 542 at the edge of private network 540; however, NAT device 542 need not be at the edge of the network.

In the embodiment of FIG. 13, host B initiates communication with host A according to the present invention. In one implementation, host B (entity 544) performs the steps that were described above in FIG. 6 for a friendly NAT application. In an alternate implementation, host B (entity 544) performs the steps that were described above in FIG. 9 for an unfriendly NAT application. NAT device 542 translates communications to and from host B so that host B can use a public IP address associated with NAT device 542.

Figure 14:
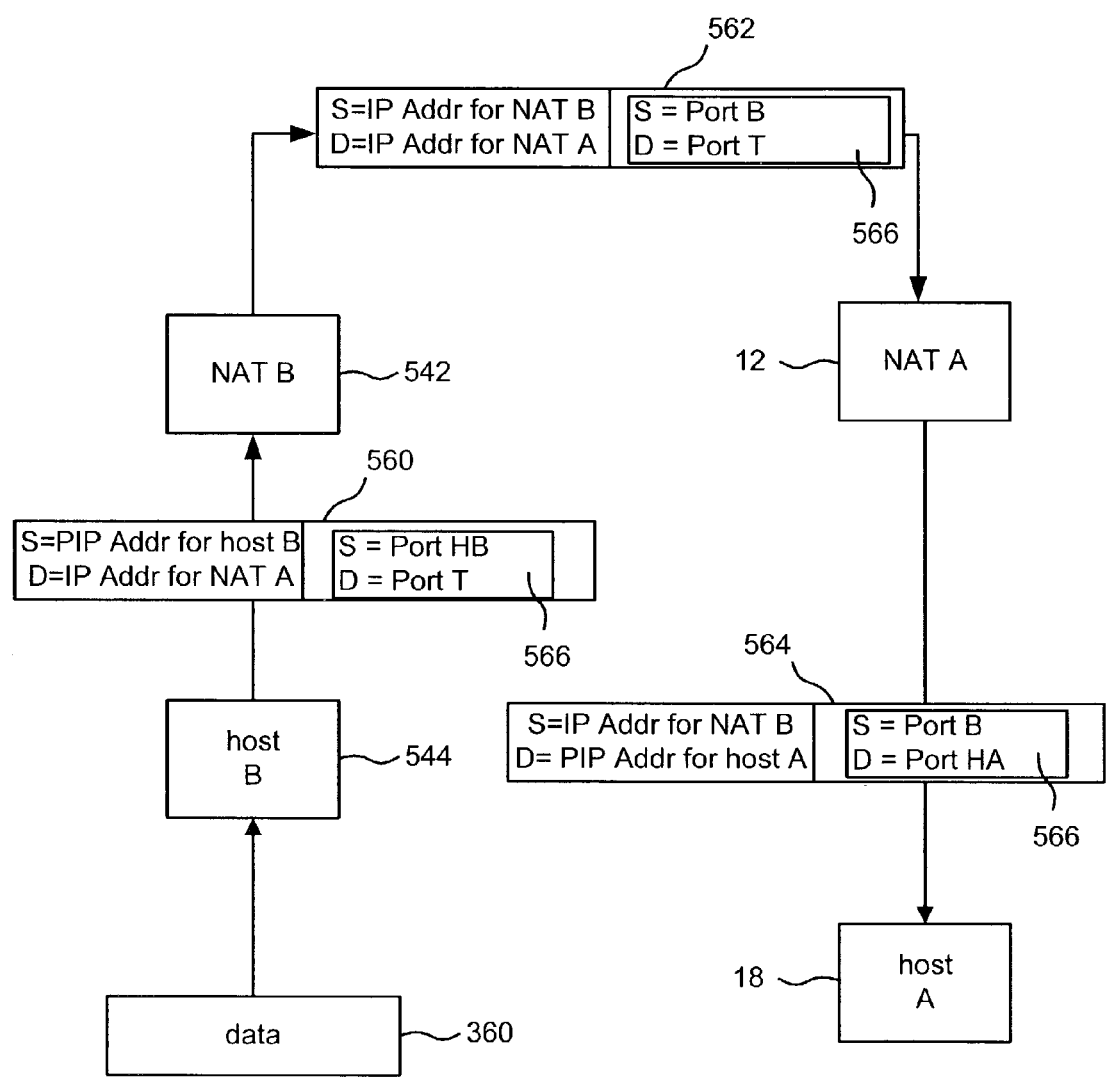
FIG. 14 is a block diagram that explains one embodiment of a process for one entity in a private network initiating communication with another entity in another private network.

FIG. 14 illustrates the steps of creating (step 308 of FIG. 6) and sending (step 310 of FIG. 6) a communication from host B to host A in the network shown in FIG. 13 when NAT device 12 is friendly. FIG. 14 differs from FIG. 7 by providing for the inclusion of NAT device 542. Host B creates a message to communicate to host A such as the data portion of UDP segment 566. UDP segment 566 lists Port T as the destination port number lists Port HB as the source port number, and optionally contains data retrieved from data store 360. As described above, host B obtains address resolution for host A from server 38. In further embodiments, NAT device 542 sets a time out interval—requiring host A to respond to UDP segment 566 within a specified period of time. In one implementation, the data in UDP segment 566 contains code calling for host A to respond to the communication. In alternate embodiments, transport layer protocols other than UDP can be employed.

Host B encapsulates UDP segment 566 in IP packet 560, which identifies NAT device 12 as the destination and host B as the source. In alternate implementations, segment 566 is spread across multiple IP packets. Host B sends IP packet 560 to NAT device 542. NAT device 542 assigns Port B as the source port number in the header of UDP segment 566. NAT device 542 forwards UDP segment 566 to NAT device 12 in IP packet 562, which has the public IP address for NAT device 542 as a source address and the public IP address for NAT device 12 as a destination address. NAT device 12 changes the destination address in IP packet 562 to the public IP address for host A and changes the port numbers to reflect the connection between host A and NAT device 12. NAT device 12 forwards the translated packet to host A.

Figure 15:
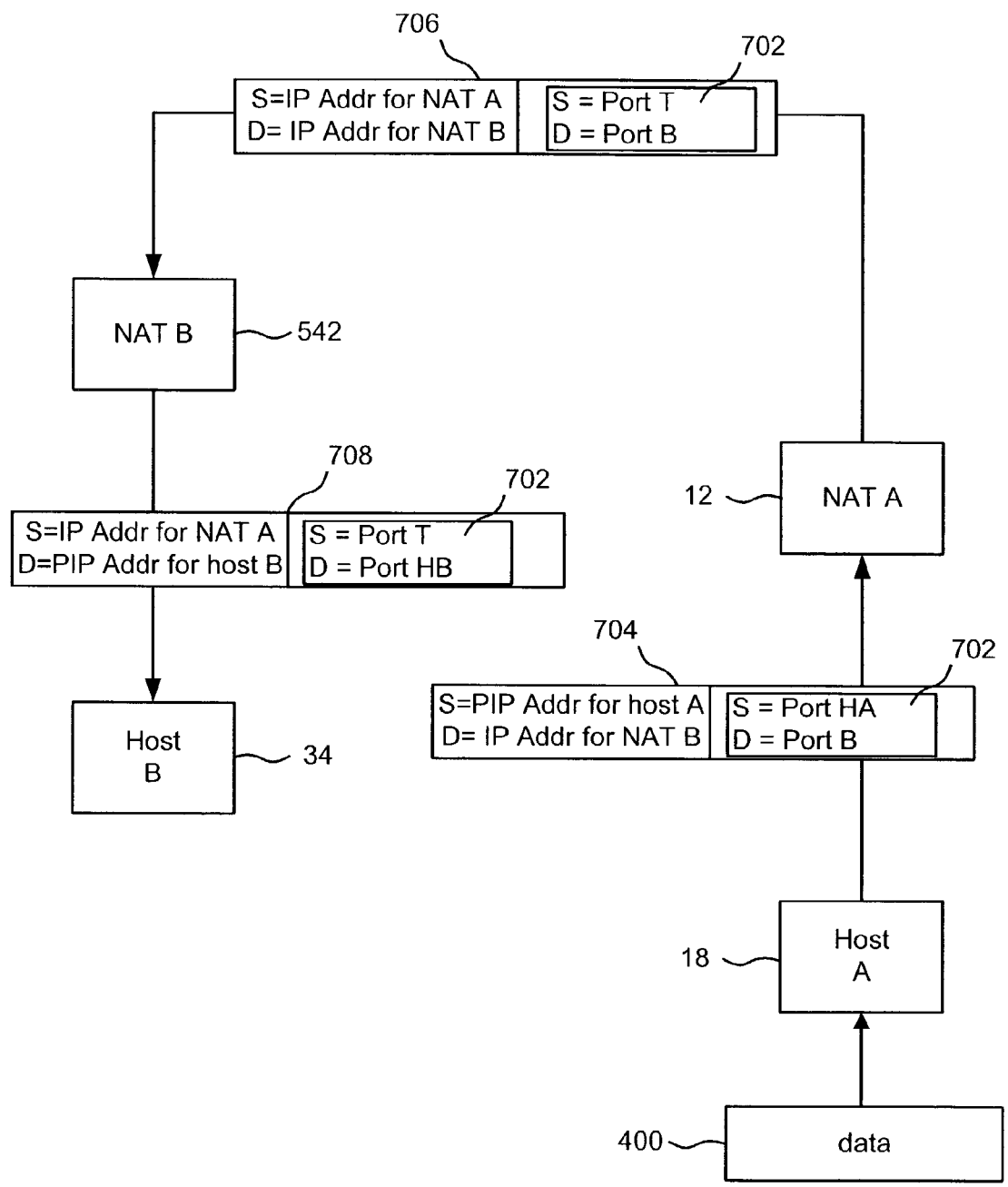
FIG. 15 is a block diagram that explains one embodiment of a process for an entity in a private network sending a message to another entity in another private network.

FIG. 15 is a block diagram describing one embodiment of a process for host A sending a communication to host B when NAT device 12 is friendly (step 316 of FIG. 6). FIG. 15 differs from FIG. 8 by providing for the inclusion of NAT device 542. Host A creates a message to communicate to host B using a transport layer protocol, such as UDP segment 702. UDP segment 702 lists Port B as the destination port number, lists Port HA as the source port number, and optionally contains data retrieved from data store 400. In alternate embodiments, transport layer protocols other than UDP can be employed.

Host A encapsulates at least a portion of UDP segment 702 in IP packet 704. In further embodiments, segment 702 is spread across multiple IP packets. IP packet 704 identifies host A as the source and NAT device 542 as the destination. Host A sends IP packet 704 to NAT device 12, which inserts Port T as the source port number for UDP segment 702. NAT device 12 forwards UDP segment 702 to NAT device 542 in IP packet 706, which lists NAT device 12 as a source and NAT device 542 as a destination. NAT device 542 forwards UDP segment 702 to host B in IP packet 708, which has NAT device 12 as a source and host B as a destination. NAT device 542 changes the destination port number to Port HB.

Figure 16:
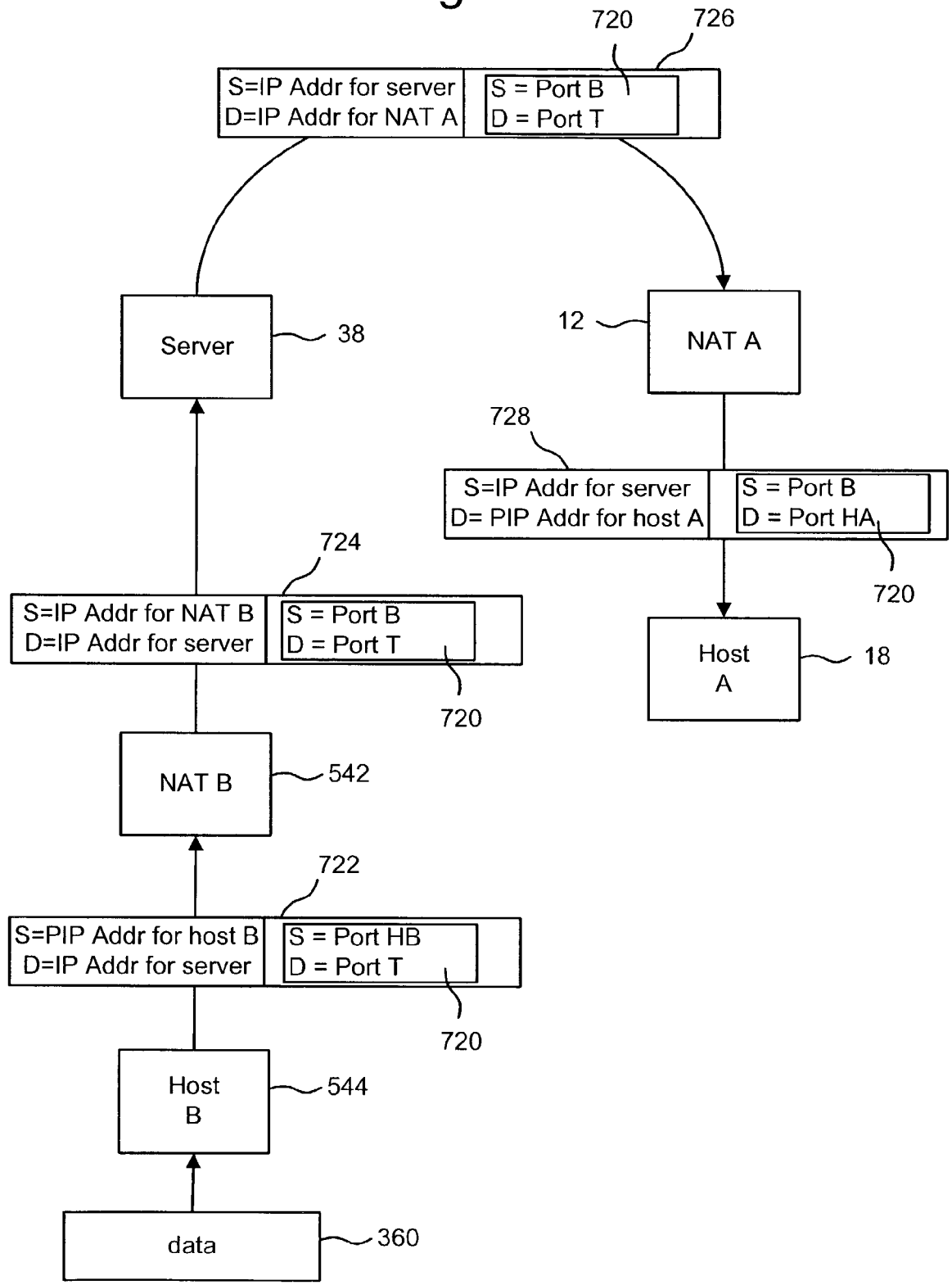
FIG. 16 is a block diagram that explains one embodiment of a process for sending a message requesting an entity in a private network to establish a connection with another entity in another private network.

FIG. 16 is a block diagram showing one embodiment of a process for requesting host A to establish a connection with host B in the network shown in FIG. 13 when NAT device 12 is unfriendly. Host B creates a UDP segment (step 440 at FIG. 9) and sends the UDP segment to host A (step 442 at FIG. 9). FIG. 16 differs from FIG. 10 by providing for the inclusion of NAT device 542.

Host B creates a message to communicate to host A, such as the data portion of UDP segment 720, listing Port T as the destination port number in the UDP segment header and Port HB as the source port number. UDP segment 720 may also contain data retrieved from data store 360, including code calling for host A to establish a connection with host B. In alternate embodiments, transport layer protocols other than UDP can be employed.

Host B encapsulates UDP segment 720 in IP packet 722, identifying server 38 as the destination and host B as the source. In alternate embodiments, segment 720 is spread across multiple IP packets. Host B forwards packet 722 to server 38 through NAT device 542 as packet 724. NAT device 542 converts packet 722 into packet 724 by changing the packet's source address to identify the public IP address of NAT device 542. NAT device 542 also inserts Port B as the source port number in the header of UDP segment 720. Server 38 sends UDP segment 720 to NAT device 12 in IP packet 726 using the persistent connection with host A. IP packet 726 identifies server 38 as the source and NAT device 12 as the destination. NAT device 12 forwards UDP segment 720 to host A in IP packet 728. NAT device 12 changes the destination address in IP packet 726 to the private IP address for host A and forwards the packet to host A as IP packet 728. NAT device 12 also changes the destination port number in segment 720 to Port HA.

Figure 17:
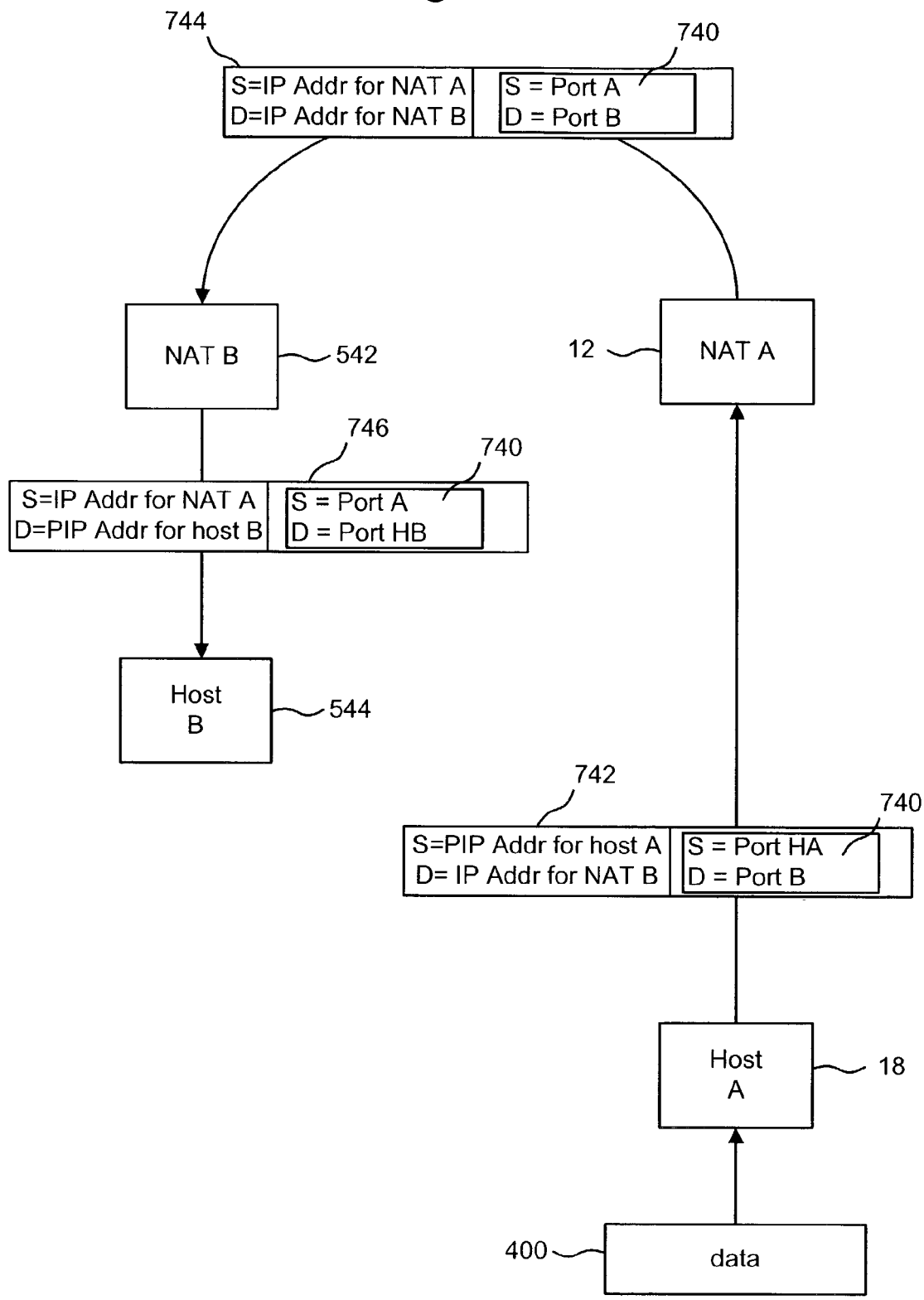
FIG. 17 is a block diagram that explains another embodiment of a process for an entity in a private network to establish a connection with another entity in another private network.

FIG. 17 is a block diagram explaining one embodiment of a process for host A establishing a connection with host B (step 444 of FIG. 13) in the network shown in FIG. 13 when NAT device 12 is unfriendly. Host A may establish a connection in response to receiving a request from host B, as illustrated in FIG. 16. Host A creates a message to communicate to host B using a transport layer protocol, such as UDP segment 740—listing Port B as the destination port number, listing Port HA as the source port number, and optionally containing data retrieved from data store 400. In alternate embodiments, transport layer protocols other than UDP can be employed.

Host A encapsulates UDP segment 740 in IP packet 742, identifying host A as the source and NAT device 542 as the destination. Host A sends IP packet 742 to NAT device 12, which forwards UDP segment 740 to NAT device 542 in IP packet 744. NAT device 12 inserts a new source port number, Port A, in the header of UDP segment 740. In some embodiments, NAT device 12 also sets a timeout interval for the new port number. NAT device 12 changes the source address in IP packet 742 to identify NAT device 12 and forwards the packet as IP packet 744. NAT device 542 forwards UDP segment 740 to host B in IP packet 746—NAT device 542 changes the destination address in packet 744 to the private IP address for host B, changes the destination port number in segment 740 to Port HB, and forwards the packet as IP packet 746.

Figure 18:
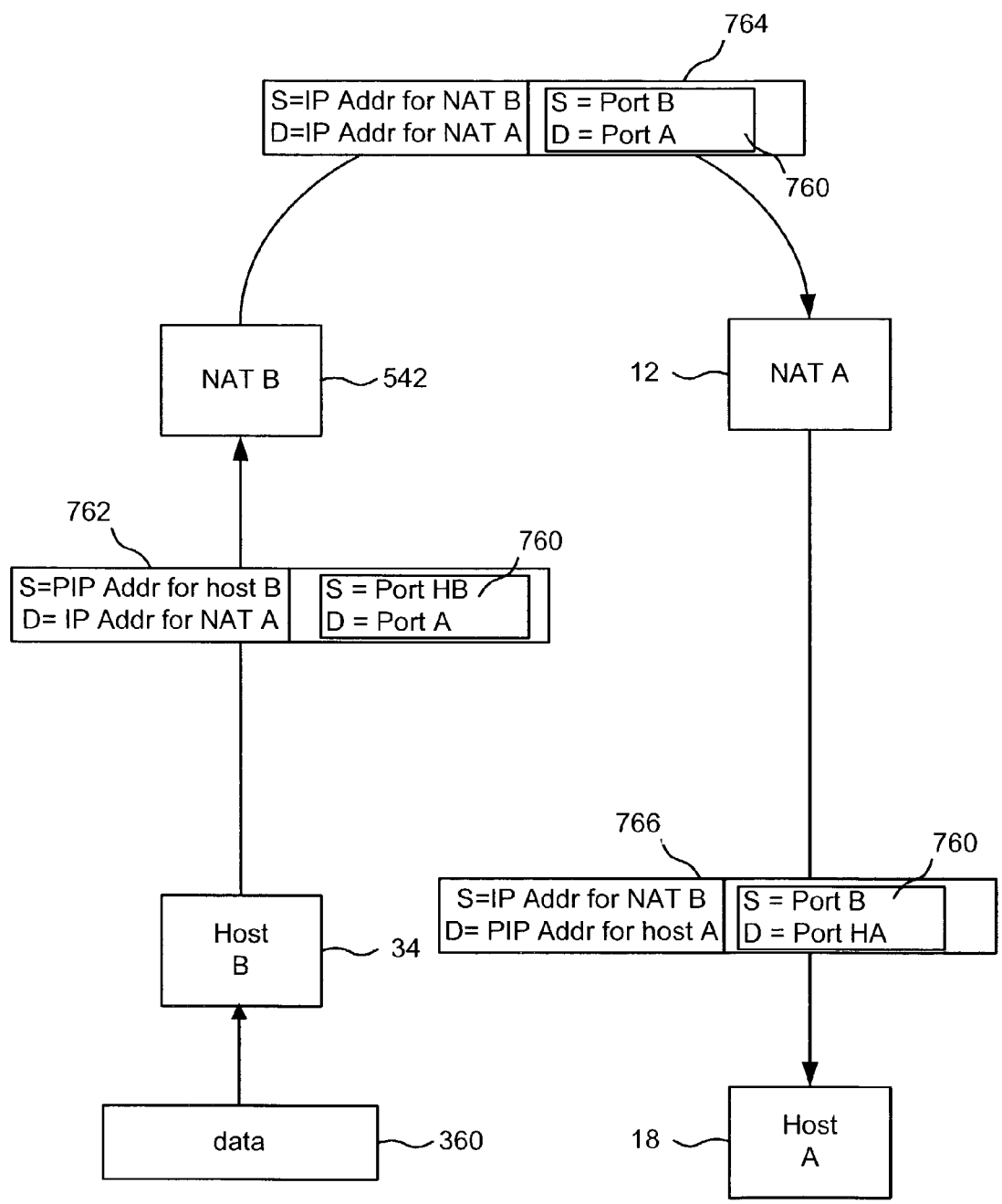
FIG. 18 is a block diagram that explains one embodiment of an entity in a private network sending a message to another entity in another private network using an established connection between the entities.

FIG. 18 is a block diagram that explains one embodiment of host B exchanging message communications (step 446 of FIG. 13) for the network shown in FIG. 13 when NAT device 12 is unfriendly. Host B creates a message to communicate to host A using a transport layer protocol. One example is UDP segment 760, listing Port A as the destination port number, listing Port HB as the destination port number, and optionally containing data retrieved from data store 360. Host B encapsulates UDP segment 760 in IP packet 762, identifying NAT device A as the destination and host B as the source. In alternate implementations, segment 760 is spread across multiple IP packets. Host B sends UDP segment 760 to NAT device 542, which forwards UDP segment 760 to NAT device 12 outside of the persistent connection between host A and server 38. NAT device 542 lists Port B as the source port number in the header of UDP segment 760. NAT device 542 also encapsulates UDP segment 760 in IP packet 764 with the public IP address for NAT device 542 as the source address and the public IP address for NAT device 12 as the destination address. NAT device 12 forwards UDP segment 760 to host A in IP packet 766. NAT device 12 changes the destination address in IP packet 764 to identify host A as the destination and forwards the packet as IP packet 766. NAT device 12 also changes the destination port number in segment 760 to be Port HA.

Note that in some embodiments, all or part of the present invention can be implemented in a NAT device, while other embodiments implement the present invention separate from a NAT device.

Figure 19:
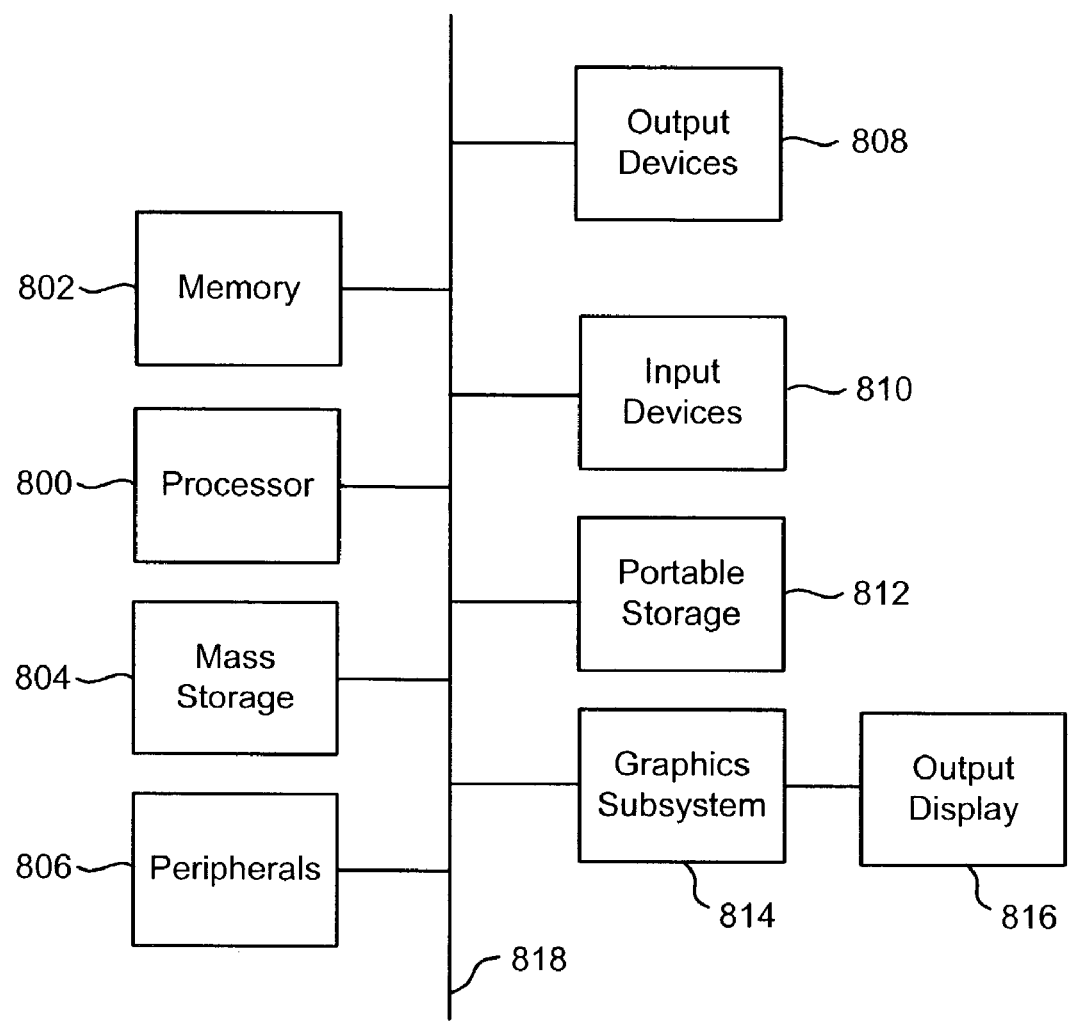
FIG. 19 is a block diagram depicting exemplar components of a computing system that can be used to implement the present invention.

FIG. 19 illustrates a high level block diagram of a computer system that can be used for the components of the present invention, including host A, host B, server 38, NAT device 542, and NAT device 12, as well as other entities mentioned above. The computer system in FIG. 19 includes processor unit 800 and main memory 802. Processor unit 800 may contain a single microprocessor, or may contain a plurality of microprocessors for configuring the computer system as a multi-processor system. Main memory 802 stores, in part, instructions and data for execution by processor unit 800. If the system of the present invention is wholly or partially implemented in software, main memory 802 can store the executable code when in operation. Main memory 802 may include banks of dynamic random access memory (DRAM) as well as high speed cache memory.

The system of FIG. 19 further includes mass storage device 804, peripheral device(s) 806, user input device(s) 810, portable storage medium drive(s) 812, graphics subsystem 814, and output display 816. For purposes of simplicity, the components shown in FIG. 19 are depicted as being connected via a single bus 818. However, the components may be connected through one or more data transport means. For example, processor unit 800 and main memory 802 may be connected via a local microprocessor bus, and the mass storage device 804, peripheral device(s) 806, portable storage medium drive(s) 812, and graphics subsystem 814 may be connected via one or more input/output (I/O) buses. Mass storage device 804, which may be implemented with a magnetic disk drive or an optical disk drive, is a non-volatile storage device for storing data and instructions for use by processor unit 800. In one embodiment, mass storage device 804 stores the system software for implementing the present invention for purposes of loading to main memory 802.

Portable storage medium drive 812 operates in conjunction with a portable non-volatile storage medium, such as a floppy disk, to input and output data and code to and from the computer system of FIG. 19. In one embodiment, the system software for implementing the present invention is stored on such a portable medium, and is input to the computer system via the portable storage medium drive 812. Peripheral device(s) 806 may include any type of computer support device, such as an input/output (I/O) interface, to add additional functionality to the computer system. For example, peripheral device(s) 806 may include a network interface for connecting the computer system to a network, a modem, a router, etc.

User input device(s) 810 provide a portion of a user interface. User input device(s) 810 may include an alpha-numeric keypad for inputting alpha-numeric and other information, or a pointing device, such as a mouse, a trackball, stylus, or cursor direction keys. In order to display textual and graphical information, the computer system of FIG. 19 includes graphics subsystem 814 and output display 816. Output display 816 may include a cathode ray tube (CRT) display, liquid crystal display (LCD) or other suitable display device. Graphics subsystem 814 receives textual and graphical information, and processes the information for output to display 816. Additionally, the system of F*igure* 19 includes output devices 808. Examples of suitable output devices include speakers, printers, network interfaces, monitors, etc.

The components contained in the computer system of FIG. 19 are those typically found in computer systems suitable for use with the present invention, and are intended to represent a broad category of such computer components that are well known in the art. Thus, the computer system of FIG. 19 can be a personal computer, handheld computing device, Internet-enabled telephone, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer-implemented method at a network interface device, the method comprising:
    establishing a communication link to a server device connected to a public network, the communication link established via a communication port at the network interface device, and the communication link being identified by a connection identifier that includes a communication port identifier of the communication port and a public network address corresponding to the network interface device;
    receiving a communication for a first device that is initiated from a second device connected to the public network, the communication routed via the public network from the second device to the network interface device bypassing the server device and received at the communication port of the network interface device, the second device having previously requested the connection identifier of the communication link from the server device, received the connection identifier that includes the communication port identifier and the public network address from the server device, and initiated the communication for the first device directed to the communication port at the network interface device according to the connection identifier; and
    determining that the communication port correlates to a private address of the first device to route the communication that is received from the second device to the first device that is connected to the network interface device via a private network.

2. A method as recited in claim 1, wherein the communication that is received for the first device does not include a public address associated with the first device.

3. A method as recited in claim 1, wherein the connection identifier that identifies the communication link is translatable by the network interface device to determine the private address of the first device connected in the private network.

4. A method as recited in claim 1, further comprising:
    receiving a response communication for the second device that is initiated from the first device; and
    forwarding the response communication to the second device via a separate communication link bypassing the server device.

5. A method as recited in claim 4, wherein the response communication is forwarded to the second device via the separate communication link that is established via a different communication port at the network interface device.

6. A method as recited in claim 5, wherein the separate communication link is identified by a new connection identifier that includes a different communication port identifier of the different communication port and the public network address corresponding to the network interface device.

7. A method as recited in claim 6, wherein the second device is connected in a second private network, and wherein the response communication is forwarded to the second device via a second NAT device that connects the public network and the second private network.

8. A method as recited in claim 5, wherein the response communication that is forwarded to the second device includes a UDP segment that is received by the second device having a header that lists a new connection identifier that identifies the separate communication link.

9. A method as recited in claim 1, wherein the network interface device comprises a NAT device, and wherein the method further comprises forwarding the communication that is received for the first device to the first device via the private network.

10. A method as recited in claim 9, wherein the second device is connected in a second private network, and wherein the communication that is initiated from the second device is routed to the network interface device via a second NAT device that connects the public network and the second private network.

11. A method as recited in claim 1, wherein the communication that is received for the first device includes a UDP segment that is received by the first device having a header that lists a new connection identifier that identifies a separate communication link that is established via a different communication port at the network interface device, the new connection identifier including a different communication port identifier of the different communication port and the public network address corresponding to the network interface device.

12. A method as recited in claim 1, wherein the communication link is established to provide access to the first device by the second device that is connected to the public network.

13. A method as recited in claim 1, wherein the first device registers with the server device when the communication link to the server device is established.

14. One or more processor readable storage devices comprising processor readable code that is executable and, in response, directs a network interface device to:
establish a communication link to a server device connected to a public network, the communication link being established via a communication port at the network interface device, and the communication link being identified by a connection identifier that includes a communication port identifier of the communication port and a public network address corresponding to the network interface device;
receive a communication for the a first device that is initiated from a second device which is connected to the public network, the communication routed via the public network from the second device to the network interface device bypassing the server device and received at the communication port of the network interface device, the second device having previously requested the connection identifier of the communication link from the server device, received the connection identifier that includes the communication port identifier and the public network address from the server device, and initiated the communication for the first device directed to the communication port at the network interface device according to the connection identifier; and
determine that the communication port correlates to a private address of the first device to route the communication that is received from the second device to the first device that is connected to the network interface device via a private network.

15. One or more processor readable storage devices as recited in claim 14, further comprising processor readable code that is executable and, in response, directs the network interface device to receive the communication for the first device without a public address associated with the first device.

16. One or more processor readable storage devices as recited in claim 14, further comprising processor readable code that is executable and, in response, directs the network interface device to translate the connection identifier that identifies the communication link to determine the private address of the first device connected in the private network.

17. One or more processor readable storage devices as recited in claim 14, further comprising processor readable code that is executable and, in response, directs the network interface device to:
receive a response communication for the second device that is initiated from the first device; and
forward the response communication to the second device via a separate communication link bypassing the server device.

18. One or more processor readable storage devices as recited in claim 17, further comprising processor readable code that is executable and, in response, directs the network interface device to forward the response communication to the second device via the separate communication link that is established via a different communication port at the network interface device.

19. One or more processor readable storage devices as recited in claim 18, further comprising processor readable code that is executable and, in response, directs the network interface device to forward the response communication that includes a UDP segment that is received by the second device having a header that lists a new connection identifier that identifies the separate communication link.

20. One or more processor readable storage devices as recited in claim 14, further comprising processor readable code that is executable and, in response, directs the network interface device to forward the communication that is received for the first device to the first device via the private network.

21. One or more processor readable storage devices as recited in claim 14, further comprising processor readable code that is executable and, in response, directs the network interface device to receive the communication that includes a UDP segment that is received by the first device having a header that lists a new connection identifier that identifies a separate communication link that is established via a different communication port of the network interface device, the new connection identifier including a different communication port identifier of the different communication port and the public network address corresponding to the network interface device.

22. One or more processor readable storage devices as recited in claim 14, further comprising processor readable code that is executable and, in response, directs the network interface device to establish the communication link to provide access to the first device by the second device that is connected to the public network.

23. One or more processor readable storage devices as recited in claim 14, further comprising processor readable code that is executable and, in response, directs the network interface device to establish the communication link to the server device via which the first device is configured to register with the server device.

24. A network interface device comprising:
a private network interface configured to interface with a first device connected in a private network;
a public network interface configured to interface with a server device connected to a public network;
a communication interface configured to:
establish a communication link to the server device, the communication link configured to be established via a communication port at the network interface device, and the communication link being identified by a connection identifier that includes a communication port identifier of the communication port and a public network address corresponding to the network interface device;

receive a communication for the first device that is initiated from a second device connected to the public network, the communication configured to be received when routed via the public network from the second device to the network interface device bypassing the server device, the second device having previously requested the connection identifier of the communication link from the server device, received the connection identifier that includes the communication port identifier and the public network address from the server device, and initiated the communication for the first device directed to the communication port at the network interface device according to the connection identifier;

receive a response communication for the second device that is initiated from the first device; and forward the response communication to the second device via a separate communication link that is established via a different communication port at the network interface device, the separate communication link being identified by a new connection identifier that includes a different communication port identifier of the different communication port and the public network address corresponding to the network interface device.

25. A network interface device as recited in claim 24, wherein the communication that is received for the first device does not include a public address associated with the first device.

26. A network interface device as recited in claim 24, wherein the connection identifier that identifies the communication link is translatable to determine a private address of the first device connected in the private network.

27. A network interface device as recited in claim 24, wherein the communication interface is further configured to establish the communication link to provide access to the first device by the second device that is connected to the public network.

28. A network interface device as recited in claim 24, wherein the network interface device comprises a stateful edge device connected in the private network.

29. A network interface device as recited in claim 24, wherein the first device is configured to register with the server device when the communication link to the server device is established.

30. A computer-implemented method at a server device, the method comprising:
 establishing a communication link from a public network to a network interface device that connects the public network and the a private network via a communication port at the network interface device, the communication link being identified by a connection identifier that includes a communication port identifier of the communication port and a public network address corresponding to the network interface device, and the private network connects a first device to the network interface device;
 receiving a request from a second device to resolve a domain name that is associated with the first device, the second device being connected via the public network to the server device; and
 communicating the connection identifier that includes the communication port identifier and the public network address of the network interface device to the second device that then initiates a communication to the first device directed to the communication port at the network interface device according to the connection identifier when the communication is routed via the public network from the second device to the network interface device bypassing the server device, the communication being routed to the first device through the network interface device.

31. A method as recited in claim 30, wherein the communication from the second device to the first device does not include a public address associated with the first device.

32. A method as recited in claim 30, wherein:
 the communication link is established to include a first connection between the server device and the network interface device via the public network, and to include a second connection between the network interface device and the first device via the private network; and
 the connection identifier that identifies the communication link is translatable by the network interface device to obtain a private address of the first device connected in the private network.

33. A method as recited in claim 30, further comprising registering the first device at the server device when the communication link is established.

34. One or more processor readable storage devices comprising processor readable code that is executable and, in response, directs a server device to:
 establish a communication link from a public network to a network interface device that connects the public network and a private network via a communication port at the network interface device, the communication link being identified by a connection identifier that includes a communication port identifier of the communication port and a public network address corresponding to the network interface device, and the private network connects a first device to the network interface device;
 receive a request from a second device to resolve a domain name that is associated with the first device, the second device being connected via the public network to the server device; and
 communicate the connection identifier that includes the communication port identifier and the public network address of the network interface device to the second device that then initiates a communication to the first device directed to the communication port at the network interface device according to the connection identifier when the communication is routed via the public network from the second device to the network interface device bypassing the server device, the communication being routed to the first device through the network interface device.

35. One or more processor readable storage devices as recited in claim 34, further comprising processor readable code that is executable and, in response, directs the server device to establish the communication link to include a first connection between the server device and the network interface device via the public network, and to include a second connection between the network interface device and the first device via the private network.

36. One or more processor readable storage devices as recited in claim 34, further comprising processor readable code that is executable and, in response, directs the server device to register the first device when the communication link is established.

37. A server device comprising:

a storage device configured to store a connection identifier that identifies a communication link to a network interface device;

a communication interface configured to:

establish the communication link from a public network to the network interface device that connects the public network and a private network via a communication port at the network interface device, the communication link being identified by a connection identifier that includes a communication port identifier of the communication port and a public network address corresponding to the network interface device, and the private network connects a first device to the network interface device;

receive a request from a second device to resolve a domain name that is associated with the first device, the second device being connected via the public network to the server device; and communicate the connection identifier that includes the communication port identifier and the public network address of the network interface device to the second device that then initiates a communication to the first device directed to the communication port at the network interface device according to the connection identifier when the communication is routed via the public network from the second device to the network interface device bypassing the server device, the communication being routed to the first device through the network interface device.

38. A server device as recited in claim 37, wherein:

the communication link is established to include a first connection between the server device and the network interface device via the public network, and to include a second connection between the network interface device and the first device via the private network; and the connection identifier that identifies the communication link is translatable by the network interface device to obtain a private address of the first device connected in the private network.

39. A server device as recited in claim 37, wherein the first device is configured to register with the server device when the communication link is established.

\* \* \* \* \*

UNITED STATES PATENT AND TRADEMARK OFFICE
CERTIFICATE OF CORRECTION

PATENT NO. : 8,234,358 B2
APPLICATION NO. : 10/233288
DATED : July 31, 2012
INVENTOR(S) : Alkhatib et al.

It is certified that error appears in the above-identified patent and that said Letters Patent is hereby corrected as shown below:

On the Title Page

On Page 3, in Item (56), under "OTHER PUBLICATIONS" in Column 1, Line 18, delete "Netowrks," and insert -- Networks, --, therefor.

On Page 3, in Item (56), under "OTHER PUBLICATIONS" in Column 1, Lines 31-32, delete "Kessler, Gary "............. (Jan. 20, 2004).".

On Page 3, in Item (56), under "OTHER PUBLICATIONS" in Column 1, Lines 33-34, delete "Rekhter, ............., (Feb. 1997).".

On Page 3, in Item (56), under "OTHER PUBLICATIONS" in Column 1, Lines 35-36, delete "Kent, ............ (Nov. 1998).".

On Page 3, in Item (56), under "OTHER PUBLICATIONS" in Column 1, Line 37, delete ""Computer...............p. 264.".

On Page 3, in Item (56), under "OTHER PUBLICATIONS" in Column 2, Line 16, delete "Infrastucture"," and insert -- Infrastructure", --, therefor.

In the Claims

In Column 15, Line 43, in Claim 14, delete "the a" and insert -- a --, therefor.

In Column 17, Line 53, in Claim 30, delete "the a" and insert -- a --, therefor.

Signed and Sealed this
Seventeenth Day of December, 2013

Margaret A. Focarino
*Commissioner for Patents of the United States Patent and Trademark Office*

Page 1 of 1